US012130567B2

(12) United States Patent
Munetsugu et al.

(10) Patent No.: US 12,130,567 B2
(45) Date of Patent: Oct. 29, 2024

(54) DEVELOPER CONTAINER AND IMAGE FORMING SYSTEM INCLUDING DETACHABLE CAP

(71) Applicant: CANON KABUSHIKI KAISHA, Tokyo (JP)

(72) Inventors: Hiroyuki Munetsugu, Kanagawa (JP); Mitsuhiro Sato, Tokyo (JP); Shinjiro Toba, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/066,750

(22) Filed: Dec. 15, 2022

(65) Prior Publication Data

US 2023/0205113 A1 Jun. 29, 2023

(30) Foreign Application Priority Data

Dec. 23, 2021 (JP) ................................ 2021-209054

(51) Int. Cl.
*G03G 15/08* (2006.01)

(52) U.S. Cl.
CPC ..... *G03G 15/0886* (2013.01); *G03G 15/0874* (2013.01); *G03G 2215/0682* (2013.01); *G03G 2215/0692* (2013.01); *Y10S 222/01* (2013.01)

(58) Field of Classification Search
CPC ........... G03G 15/0886; G03G 15/0894; G03G 15/0874; G03G 2215/0682; G03G 2215/0692; Y10S 222/01
See application file for complete search history.

(56) References Cited

U.S. PATENT DOCUMENTS 5,351,728 A * 10/1994 Ban .................... G03G 15/0882 399/119
2001/0033758 A1* 10/2001 Katsuyama ........ G03G 15/0865 399/258
2007/0147902 A1* 6/2007 Taguchi ............ G03G 15/0863 399/262
2021/0405552 A1* 12/2021 Sato ................... G03G 15/0862
2023/0152729 A1* 5/2023 Toba .................. G03G 15/0886 399/262

FOREIGN PATENT DOCUMENTS

JP 2003040295 A * 2/2003
JP 2005075370 A 3/2005
JP 2021026199 A 2/2021
JP 2021026202 A 2/2021

* cited by examiner

*Primary Examiner* — Arlene Heredia
*Assistant Examiner* — Laura Roth
(74) *Attorney, Agent, or Firm* — CANON U.S.A., INC. IP DIVISION

(57) ABSTRACT

A developer container includes a pouch, a communication member, and a cap. A marking including an arrowhead part and a parting line are formed on an outer peripheral surface of the cap. A rear end of the arrowhead part is disposed between a first position that is a position 45° upstream from a reference position in a direction of rotation and a second position that is a position 45° downstream in the direction of rotation. The rear end of the arrowhead part overlaps the parting line.

15 Claims, 29 Drawing Sheets

DEVELOPER CONTAINER AND IMAGE FORMING SYSTEM INCLUDING DETACHABLE CAP

BACKGROUND

Field of the Disclosure

The present disclosure relates to a developer container that is used for an image forming apparatus and configured to accommodate powder or liquid contents, and an image forming system.

Description of the Related Art

In general, an electrophotographic image forming apparatus forms an image by transferring a toner image formed on the surface of a photosensitive drum to a transfer material that is a transfer medium. The toner is replenished using a known system such as a process cartridge system or a toner replenishment system. The process cartridge system refers to a system where the photosensitive drum and a developing container are integrated as a process cartridge, and the process cartridge is replaced with a new one when the toner runs out.

The toner replenishment system is a system where the developing container is replenished with new toner when the toner runs out. For example, Japanese Patent Application Laid-Open No. 2021-26199 discusses an image forming apparatus where a developing container is replenished with toner using a toner pouch mountable on a mounting unit disposed on the developing container.

Various use modes of image forming apparatuses, including the foregoing process cartridge system and toner replenishment system, have been demanded by users in recent years.

SUMMARY

Aspects of the present disclosure provide a developer container for accommodating powder or liquid contents.

According to an aspect of the present disclosure, a developer container configured to accommodate a developer includes a pouch including a bottom portion and a side portion extending from the bottom portion to form an opening, a communication member configured to make inside of the pouch communicate with outside, the communication member being fixed to the opening of the pouch, and a cap formed by injection molding and configured to be detached from the communication member by rotation with respect to the communication member, a marking indicating a direction of rotation to detach the cap from the communication member and a parting line extending in a direction along a rotation axis of the cap being disposed on an outer peripheral surface of the cap, the marking including an arrowhead part formed to protrude from the outer peripheral surface, the arrowhead part including a rear end located upstream and a front end located downstream in the direction of rotation, wherein a direction connecting the opening and the bottom portion of the pouch is a first direction, a longitudinal direction of a cross-sectional shape of the pouch is a second direction, the second direction being orthogonal to the first direction, and a direction orthogonal to the first direction and the second direction is a third direction, wherein in a state of the cap attached to the communication member, the cap has a reference position in the second direction on the outer peripheral surface, the reference position being a position corresponding to where a thickness of the pouch in the third direction is maximized in a case where the pouch is viewed along the first direction, and wherein the rear end is disposed along the outer peripheral surface between a first position and a second position in the direction of rotation, the rear end being located to overlap the parting line, the first position of the rear end being a position 450 upstream from the reference position in the direction of rotation with the rotation axis as a center of rotation, the second position being a position 450 downstream from the reference position in the direction of rotation with the rotation axis as the center of rotation.

Further features of the present disclosure will become apparent from the following description of the embodiments with reference to the attached drawings.

DESCRIPTION OF THE EMBODIMENTS

Exemplary embodiments of the present disclosure will be described below with reference to the drawings.

Figure 1A:
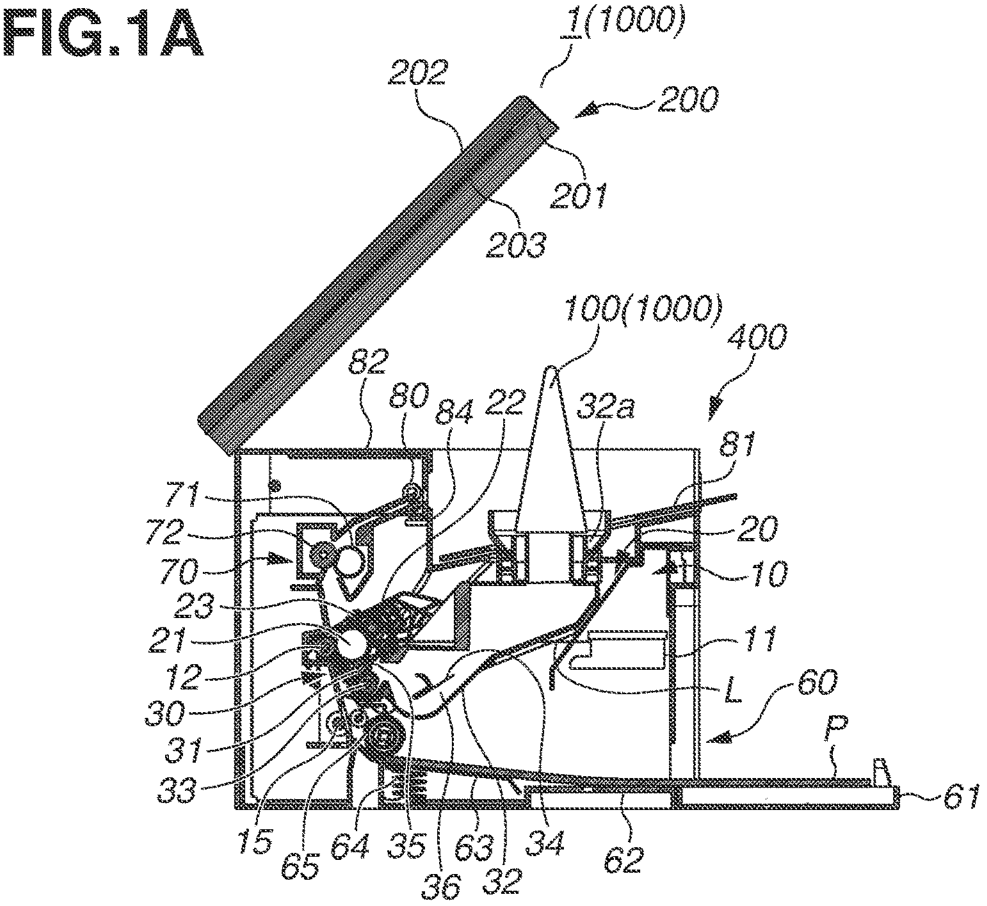
FIG. 1A is a schematic diagram illustrating an image forming apparatus constituting an image forming system according to a first embodiment of the present disclosure.
Figure 1B:
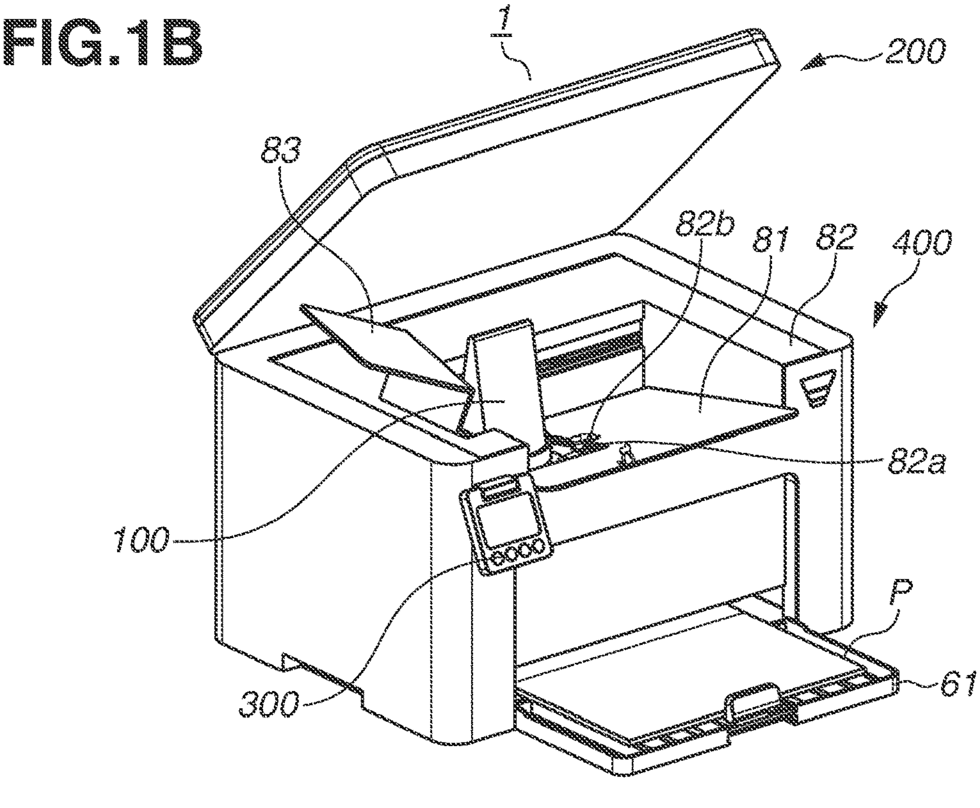
FIG. 1B is a perspective view illustrating the image forming apparatus.
Figure 2:
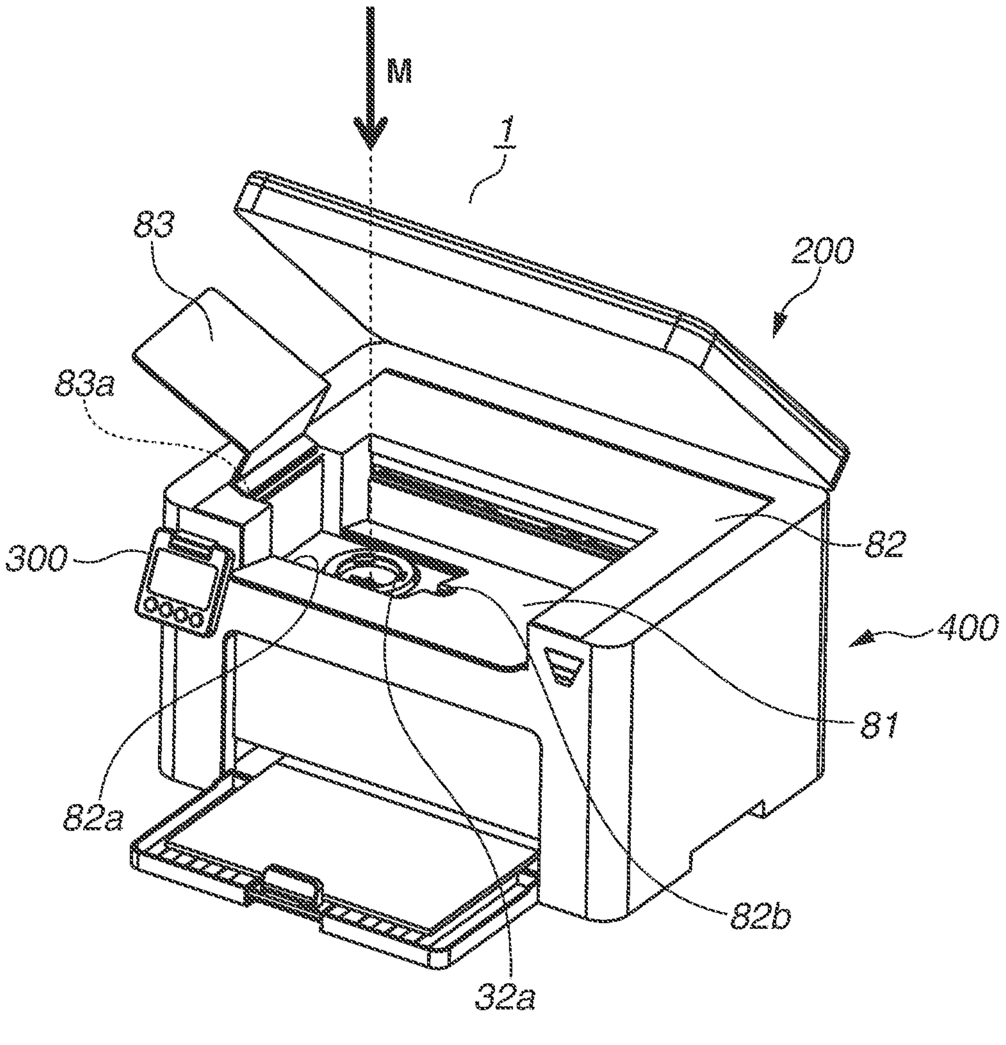
FIG. 2 is a perspective view illustrating an opening and closing member and a replenishment port.

FIG. 1A is a schematic diagram illustrating a configuration of an image forming apparatus 1 according to a first embodiment. FIG. 1B is a perspective view illustrating the configuration of the image forming apparatus 1. FIG. 2 is a perspective view illustrating an opening and closing member 83 and a replenishment port 32*a*.

The image forming apparatus 1 is a monochrome printer that forms an image on a recording material P based on image information input from an external apparatus. Recording materials P include various different types of sheet materials, including paper such as plain paper and thick paper, a plastic film such as an overhead projector sheet, specially shaped sheets such as an envelope and an index sheet, and cloth.

[Overall Configuration]

As illustrated in FIGS. 1A and 1B, the image forming apparatus 1 includes an apparatus main body 400, a reading apparatus 200 openably and closably supported by the apparatus main body 400, and an operation unit 300 attached to an exterior surface of the apparatus main body 400. The apparatus main body 400 includes an image forming unit 10, a feed unit 60, a fixing unit 70, and a discharge roller pair 80. The image forming unit 10 forms a toner image on a recording material P. The feed unit 60 feeds the recording material P to the image forming unit 10. The fixing unit 70 fixes the toner image formed by the image forming unit 10 to the recording material P.

The image forming unit 10 includes a scanner unit 11, an electrophotographic process unit 20, and a transfer roller 12 that transfers a toner image formed on a photosensitive drum 21 of the process unit 20 to the recording material P. The process unit 20 includes the photosensitive drum 21, and a charging roller 22, a pre-exposure device 23, and a developing device 30 including a developing roller 31, which are located around the photosensitive drum 21.

The photosensitive drum 21 is a photosensitive member formed in a cylindrical shape. The photosensitive drum 21 according to the present embodiment includes a photosensitive layer made of an organic photosensitive material having negative chargeability on a drum-shaped base made of aluminum. The photosensitive drum 21 is driven to rotate at a predetermined process speed in a predetermined direction (clockwise in the diagram) by a motor.

The charging roller 22 contacts the photosensitive drum 21 with a predetermined pressing force to form a charging portion. A desired charging voltage is applied to the charging roller 22 by a charging high voltage power supply, whereby the surface of the photosensitive drum 21 is uniformly charged to a predetermined potential. In the present embodiment, the photosensitive drum 21 is charged to negative polarity by the charging roller 22. To produce a stable discharge at the charging portion, the pre-exposure device 23 neutralizes the surface potential of the photosensitive drum 21 at a position before the charging portion.

The scanner unit 11 scans and exposes the surface of the photosensitive drum 21 by irradiating the photosensitive drum 21 with laser light corresponding to image information input from the external apparatus or the reading apparatus 200 using a polygon mirror. An electrostatic latent image based on the image information is formed on the surface of the photosensitive drum 21 by the exposure. The scanner unit 11 is not limited to a laser scanner device. For example, a light-emitting diode (LED) exposure device including an LED array where a plurality of LEDs is arranged along the longitudinal direction of the photosensitive drum 21 may be employed.

The developing device 30 includes the developing roller 31 that bears a developer, a developing container 32 serving as a case of the developing device 30, and a supply roller 33 that can supply the developer to the developing roller 31.

The developing roller 31 and the supply roller 33 are rotatably supported by the developing container 32. The developing roller 31 is located in an opening of the developing container 32 to be opposed to the photosensitive drum 21.

The supply roller 33 rotatably makes contact with the developing roller 31. Toner that is the contents accommodated in the developing container 32 is applied to the surface of the developing roller 31 by the supply roller 33. Note that the supply roller 33 is not necessarily needed as long as the developing device 30 is configured so that sufficient toner can be supplied to the developing roller 31.

The developing device 30 according to the present embodiment uses a contact developing system. Specifically, a toner layer borne on the developing roller 31 contacts the photosensitive drum 21 at a developing portion (developing area) where the photosensitive drum 21 and the developing roller 31 are opposed to each other. A developing voltage is applied to the developing roller 31 by a developing high voltage power supply. Under the developing voltage, the toner borne on the developing roller 31 is transferred from the developing roller 31 to the surface of the photosensitive drum 21 based on a potential distribution at the drum surface, whereby the electrostatic latent image is developed into a toner image.

The present embodiment employs a reversal developing system. Specifically, the surface of the photosensitive drum 21 is charged in a charging step and then a toner image is formed by the adhesion of toner to the surface area of the photosensitive drum 21 where the amount of charge is attenuated by exposure in an exposure step.

In the present embodiment, toner having a particle size of 6 [μm] and negative regular charging polarity is used. An example of the toner employed in the present embodiment is polymerized toner generated by polymerization. The toner according to the present embodiment is a nonmagnetic one-component developer that contains no magnetic component and is borne on the developing roller 31 mainly by intermolecular force or electrostatic force (image force).

However, a one-component developer containing a magnetic component may be used. The one-component developer can contain additives (such as wax and fine silica particles) for adjusting fluidity and charging performance of the toner aside from the toner particles.

A two-component developer including nonmagnetic toner and a magnetic carrier may be used as the developer. In the case of using a magnetic developer, a cylindrical developing sleeve with a magnet inside is used as a developer bearing member, for example.

The developing container 32 includes a toner accommodation unit 36 that accommodates the toner, and an agitation member 34 that is disposed inside the toner accommodation unit 36. The agitation member 34 is driven to rotate by a not-illustrated motor, and thereby agitates the toner in the developing container 32 and feeds the toner toward the developing roller 31 and the supply roller 33.

The agitation member 34 also has a function of circulating toner not used for development and scraped off the developing roller 31 inside the developing container 32 to uniformize the toner in the developing container 32. The agitation member 34 is not limited to the rotating configuration. For example, a swinging agitation member may be employed.

A developing blade 35 for regulating the amount of toner borne on the developing roller 31 is located at the opening of the developing container 32 where the developing roller 31 is located. As the developing roller 31 rotates, the toner supplied to the surface of the developing roller 31 passes through the portion opposed to the developing blade 35, and is thereby uniformly reduced in layer thickness and charged to negative polarity by triboelectric charging.

As illustrated in FIGS. 1A and 1B, the feed unit 60 includes a front door 61 openably and closably supported by the apparatus main body 400, a tray unit 62, a center plate 63, a tray spring 64, and a pickup roller 65. The tray unit 62 constitutes the bottom of a recording material accommodation space that appears when the front door 61 is open. The center plate 63 is liftably supported by the tray unit 62.

The tray spring 64 biases the center plate 63 upward, whereby recording materials P stacked on the center plate 63 are pressed against the pickup roller 65. The front door 61 of the apparatus main body 400, when closed, closes the recording material accommodation space, and when opened, supports the recording materials P with the tray unit 62 and the center plate 63.

The fixing unit 70 is a thermal fixing unit that performs image fixing processing by heating to melt the toner on the recording material P. The fixing unit 70 includes a fixing film 71, a fixing heater for heating the fixing film 71 such as a ceramic heater, a thermistor for measuring the temperature of the fixing heater, and a pressure roller 72 pressed against the fixing film 71.

Next, an image forming operation by the image forming apparatus 1 will be described.

When an image formation command is input to the image forming apparatus 1, the image forming unit 10 starts an image formation process based on image information input from an external computer connected to the image forming apparatus 1 or from the reading apparatus 200. The scanner unit 11 irradiates the photosensitive drum 21 with laser light based on the input image information. Here, the photosensitive drum 21 is charged by the charging roller 22 in advance, and the irradiation with the laser light forms an electrostatic latent image on the photosensitive drum 21. The developing roller 31 then develops the electrostatic latent image, whereby a toner image is formed on the photosensitive drum 21.

In parallel with the foregoing image formation process, the pickup roller 65 of the feed unit 60 feeds a recording material P supported by the front door 61, the tray unit 62, and the center plate 63. The recording material P is fed to a registration roller pair 15 by the pickup roller 65, and abutted against a nip between the registration roller pair 15 for skew correction. The registration roller pair 15 is then driven in synchronization with the transfer timing of the toner image to convey the recording material P toward a transfer nip formed between the transfer roller 12 and the photosensitive drum 21.

A transfer voltage is applied to the transfer roller 12 from a transfer high voltage power supply, and the toner image borne on the photosensitive drum 21 is transferred to the recording material P conveyed by the registration roller pair 15. The recording material P to which the toner image is transferred is conveyed to the fixing unit 70. The toner image is heated and pressurized while the recording material P passes through a nip portion between the fixing film 71 and the pressure roller 72 of the fixing unit 70.

The toner particles are thereby melted and then adhere, whereby the toner image is fixed to the recording material P. The recording material P passed through the fixing unit 70 is discharged out of (outside) the image forming apparatus 1 by the discharge roller pair 80, and stacked on a discharge tray 81 located on top of the apparatus main body 400.

The discharge tray 81 is upwardly inclined toward downstream in the discharge direction of the recording material P. Recording materials P discharged to the discharge tray 81 slide down the discharge tray 81, whereby the trailing edges are aligned by a regulation surface 84.

The reading apparatus 200 includes a reading unit 201 that includes a not-illustrated built-in reading module, and a pressing plate 202 that is openably and closably supported by the reading unit 201. A document glass plate 203 which transmits light emitted from the reading module and on which a document is placed is located at the top of the reading unit 201.

In reading a document image using the reading apparatus 200, the user places the document on the document glass plate 203 with the pressing plate 202 open. The user then closes the pressing plate 202 to prevent displacement of the document on the document glass plate 203, and issues a read command to the image forming apparatus 1 by operating the operation unit 300, for example.

Starting a reading operation, the reading module in the reading unit 201 reciprocates in a sub scanning direction, i.e., laterally in a state where the operation unit 300 of the image forming apparatus 1 is seen from the front. The reading module emits light from a light emission part toward the document while receiving light reflected from the document using a light reception part, and reads the document image through photoelectric conversion. In the following description, a front-to-rear direction, a lateral direction, and a vertical direction are defined with reference to the state where the operation unit 300 is seen from the front.

A top cover 82 is disposed on top of the apparatus main body 400. The top surface of the top cover 82 forms the discharge tray 81. As illustrated in FIGS. 1B and 2, the top cover 82 openably and closably supports the opening and closing member 83 about a rotation shaft 83*a* extending in the front-to-rear direction. An opening 82*a* open upward is formed in the discharge tray 81 of the top cover 82.

The opening and closing member 83 is configured to be movable between a closed position where the replenishment port 32*a* is covered so that a toner pack 100 is unable to be mounted on the developing container 32 and an open position where the replenishment port 32*a* is exposed so that the toner pack 100 can be mounted on the developing container 32. With the opening and closing member 83 at the open position, the toner pack 100 is moved toward the replenishment port 32*a* in a mounting direction M and mounted on the replenishment port 32*a*.

The opening and closing member 83, at the closed position, functions as a part of the discharge tray 81. The opening and closing member 83 and the opening 82*a* are located in the left part of the discharge tray 81. The opening and closing member 83 is opened to the left with a finger engaged with a groove portion 82*b* formed in the top cover 82. The opening and closing member 83 is formed in a substantially L shape along the shape of the top cover 82.

The opening 82*a* of the discharge tray 81 opens to expose the replenishment port 32*a* for toner replenishment formed in the top of the developing container 32. With the opening and closing member 83 open, the user can access the replenishment port 32*a*. Note that the present embodiment employs a system where the user replenishes the developing device 30 with toner from the toner pack 100 filled with replenishment toner (see FIGS. 1A and 1B) in a state where the developing device 30 is attached to the image forming apparatus 1 (direct replenishment system). The toner pack 100, in the state of being mounted on a mounting unit 106 of the image forming apparatus 1, is exposed outside at least in part.

Such a system eliminates the need to remove the process unit 20 from the apparatus main body 400 and replace the process unit 20 with a new one when the remaining toner level of the process unit 20 runs low, and can thus improve usability. Moreover, the developing container 32 can be replenished with toner more inexpensively than by replacing the entire process unit 20.

With the direct replenishment system, various rollers and gears do not need to be replaced. This can reduce cost even as compared to the case where only the developing device 30 of the process unit 20 is replaced. The image forming apparatus 1 and the toner pack 100 according to the present embodiment constitutes an image forming system 1000.

[Mounting Unit]

Next, a configuration of the mounting unit 106 on which the toner pack 100 is mounted will be described with reference to FIGS. 3A to 7B.

In the present embodiment, the mounting unit 106 is a unit for mounting the toner pack 100. The mounting unit 106 includes the replenishment port 32*a* and is disposed in the image forming apparatus 1 (see FIG. 2).

Figure 3A:
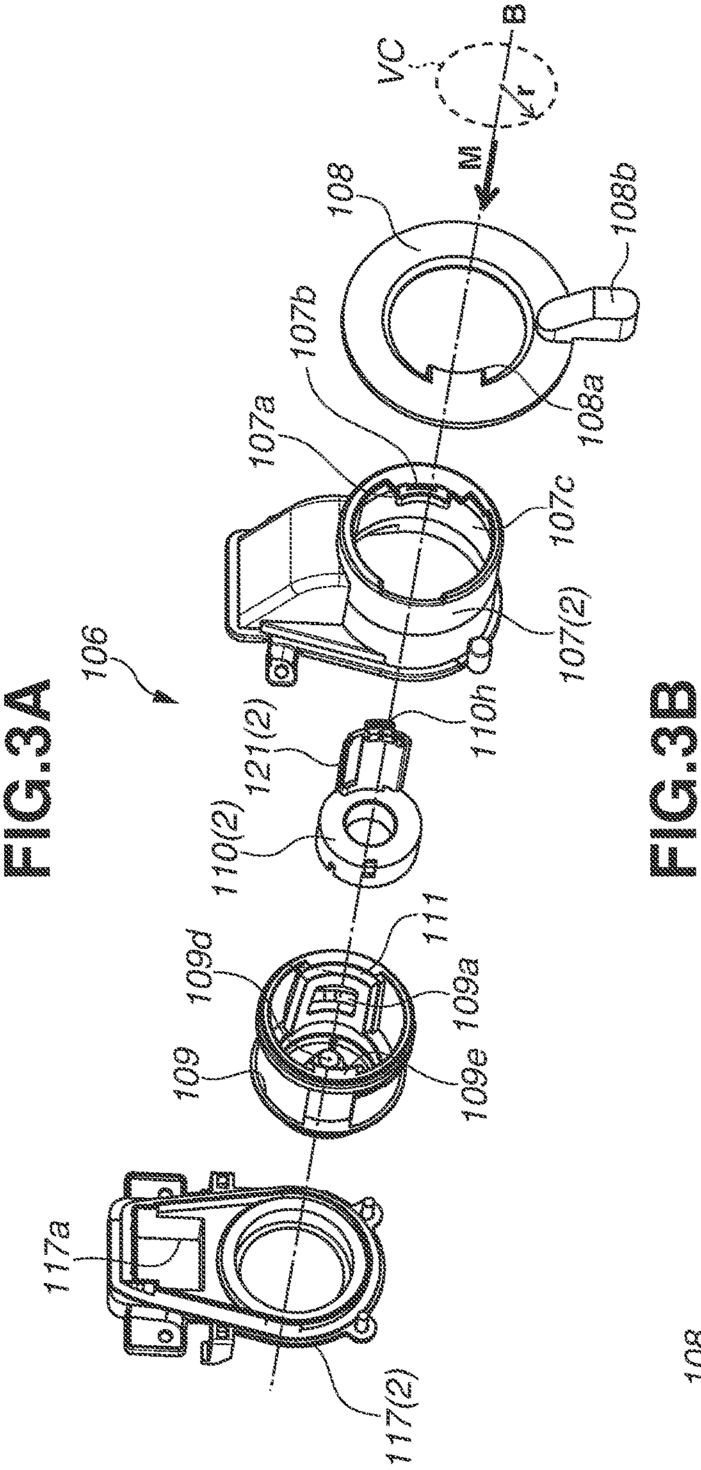
FIG. 3A is an exploded perspective view of a mounting unit.
Figure 3B:
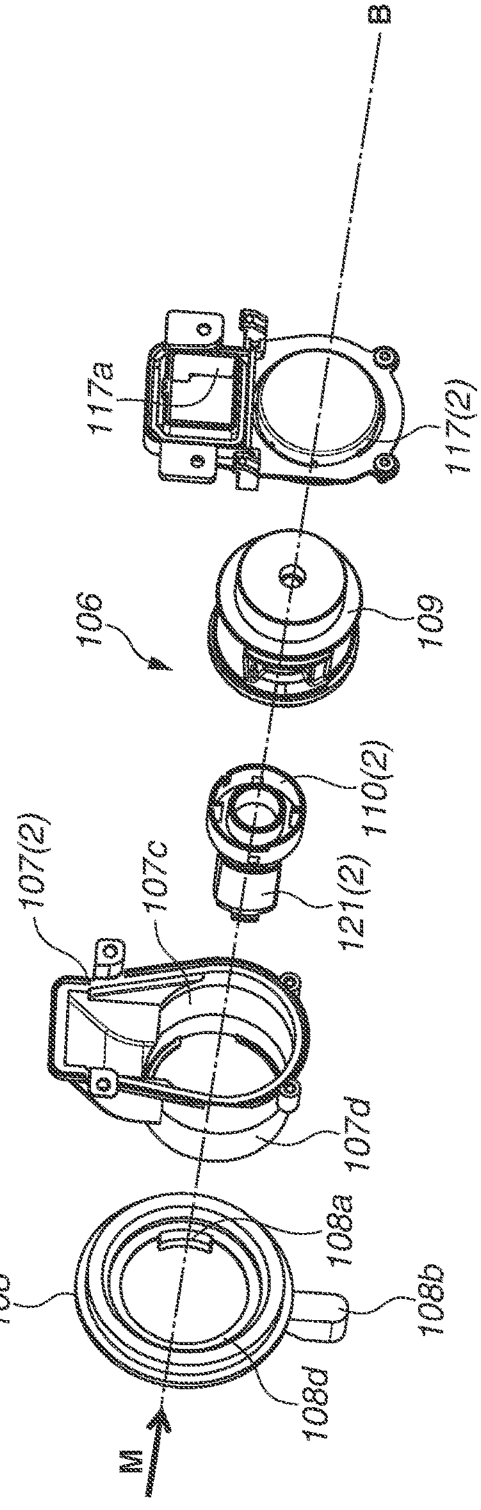
FIG. 3B is an exploded perspective view of the mounting unit seen in a direction different from that of FIG. 3A.

FIG. 3A is an exploded perspective view of the mounting unit 106. FIG. 3B is an exploded perspective view of the mounting unit 106 seen in a direction different from that of FIG. 3A.

Figure 4A:
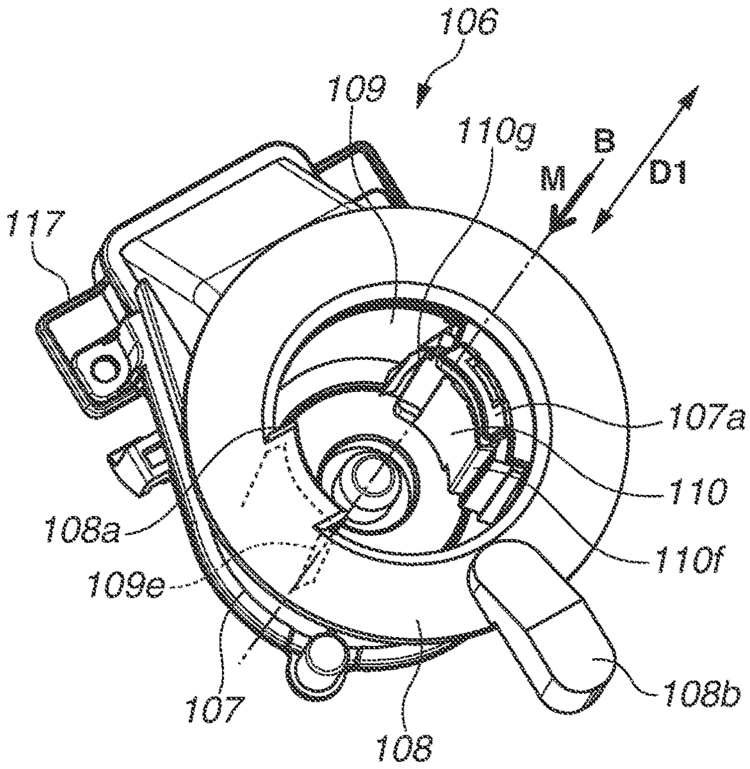
FIG. 4A is a perspective view illustrating an appearance of the mounting unit when an operation lever is at a closed position.
Figure 4B:
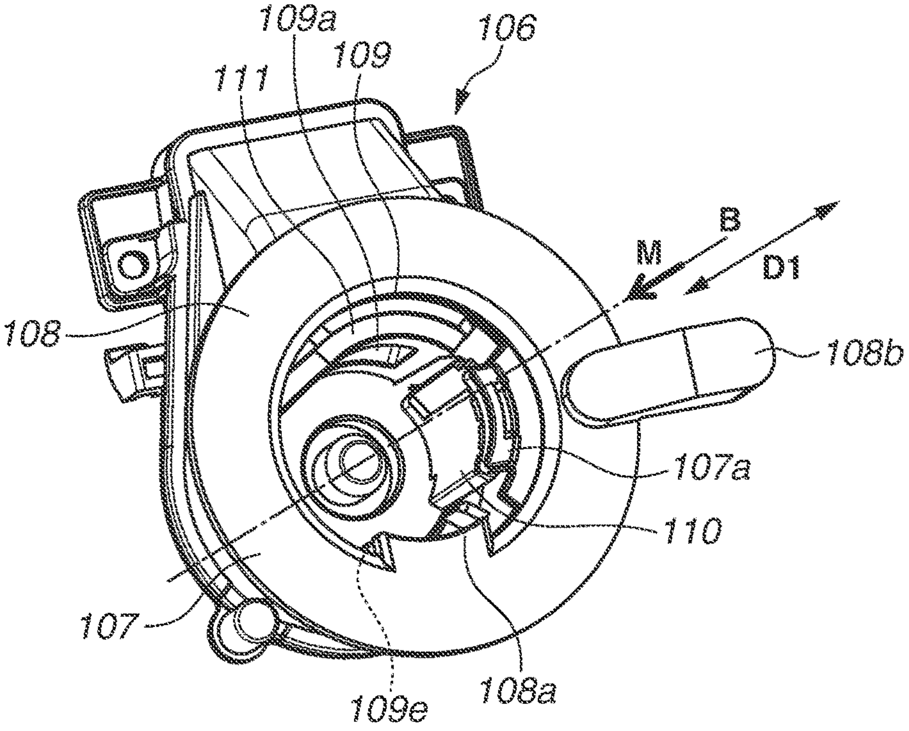
FIG. 4B is a perspective view illustrating the appearance of the mounting unit when the operation lever is at an open position.
Figure 5A:
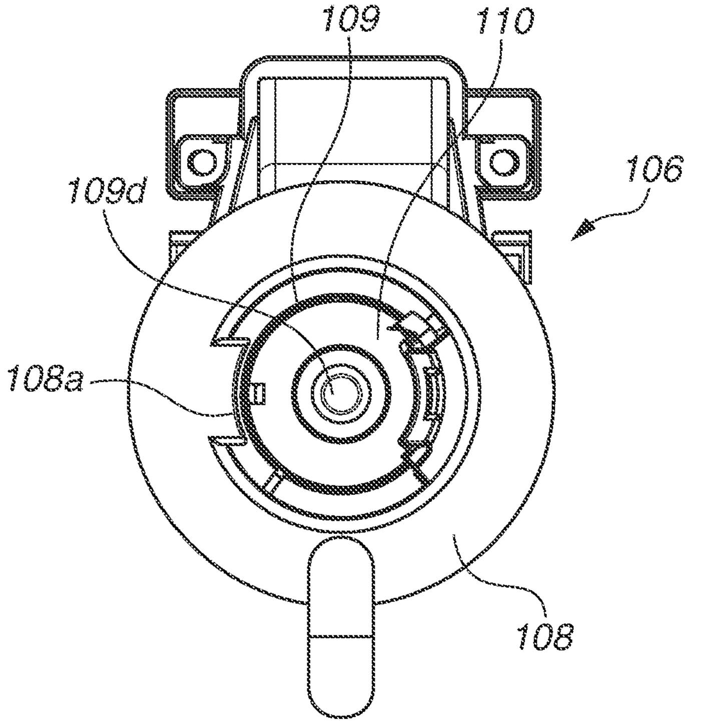
FIG. 5A is a plan view illustrating the appearance of the mounting unit when the operation lever is at the closed position.
Figure 5B:
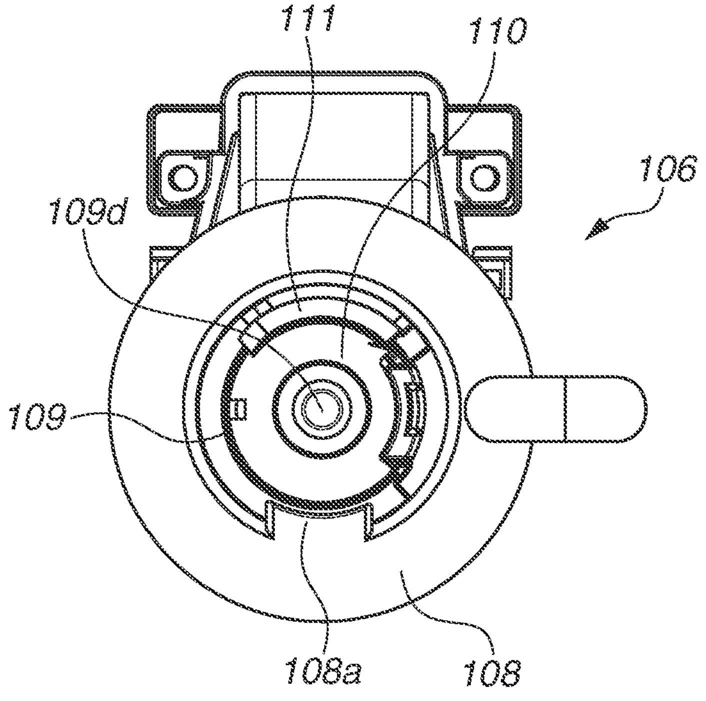
FIG. 5B is a plan view illustrating the appearance of the mounting unit when the operation lever is at the open position.

FIGS. 4A and 5A are a perspective view illustrating an appearance of the mounting unit 106 and a view of the mounting unit 106 seen in the mounting direction M, respectively, when an operation lever 108 is at a closed position. FIGS. 4B and 5B are a perspective view illustrating the appearance of the mounting unit 106 and a view of the mounting unit 106 seen in the mounting direction M, respectively, when the operation lever 108 is at an open position.

Figure 6A:
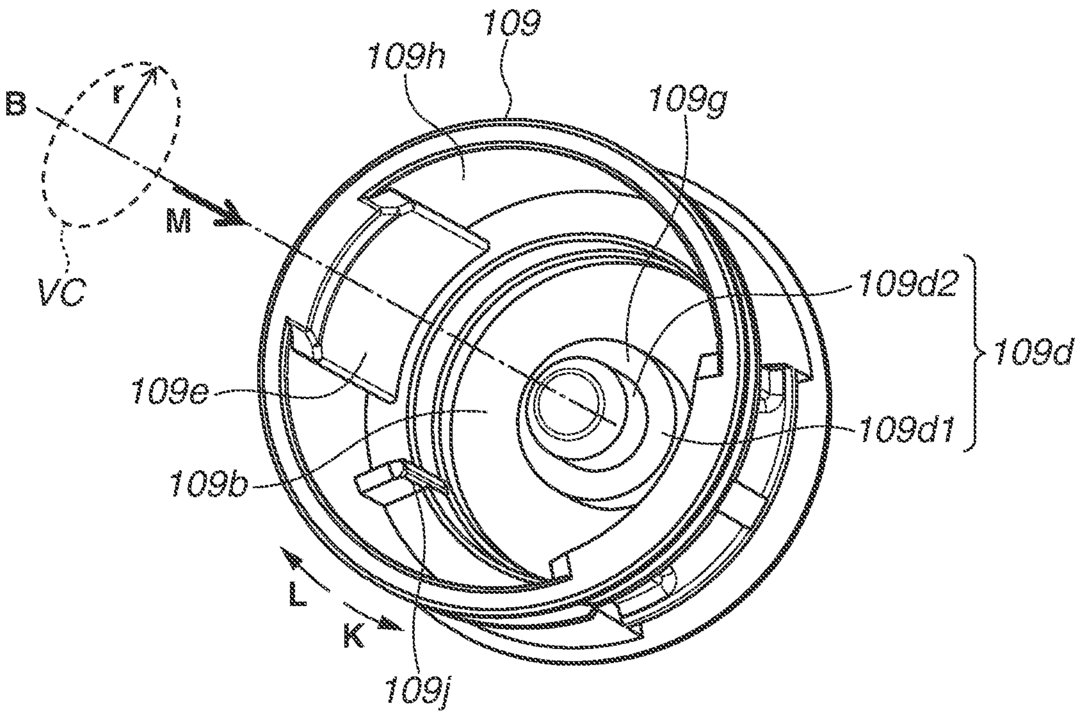
FIG. 6A is a perspective view of an apparatus-side shutter seen from upstream in a mounting direction.
Figure 6B:
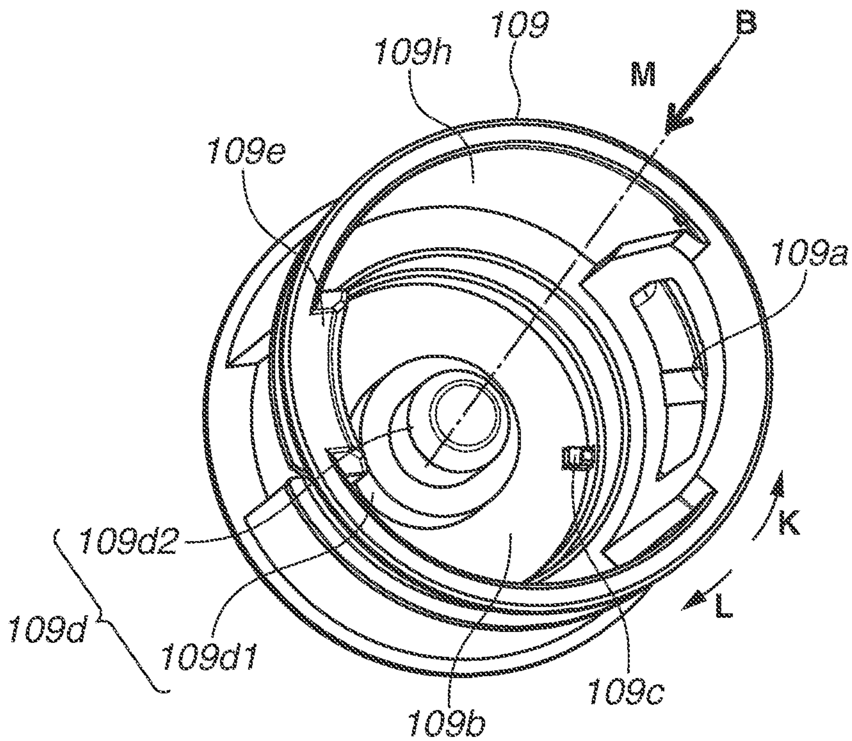
FIG. 6B is a perspective view of the apparatus-side shutter from a point of view different from that of FIG. 6A.

FIG. 6A is a perspective view of an apparatus-side shutter 109 seen from upstream in the mounting direction M. FIG. 6B is a perspective view of the apparatus-side shutter 109 seen from a point of view different from that of FIG. 6A.

Figure 7A:
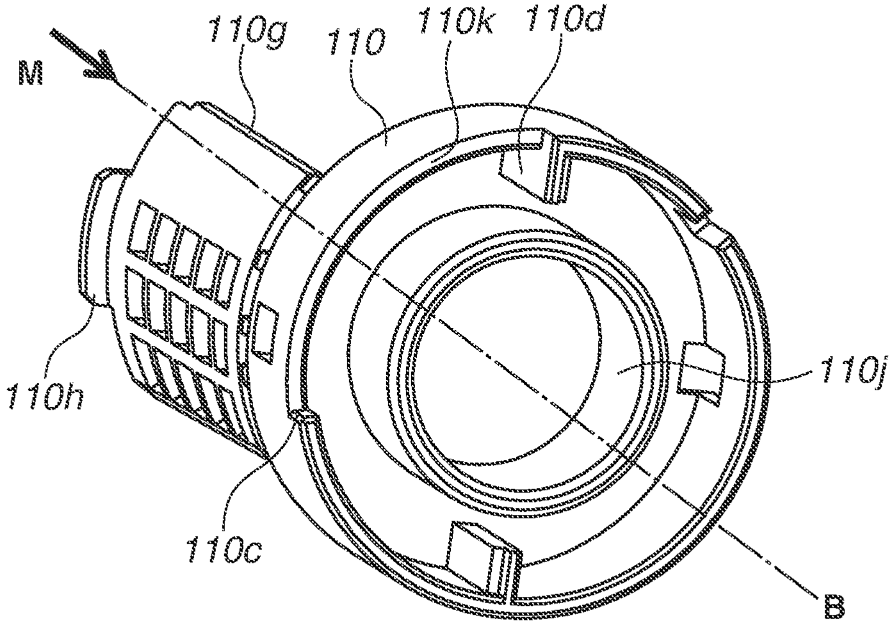
FIG. 7A is a perspective view of a cover seen from downstream in the mounting direction.
Figure 7B:
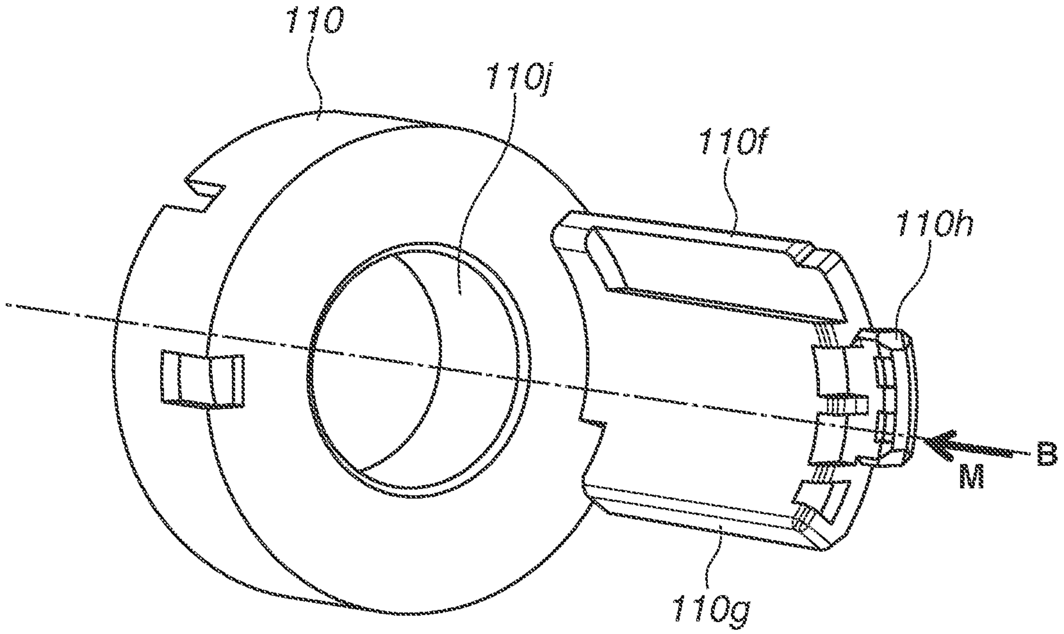
FIG. 7B is a perspective view of the cover seen from upstream in the mounting direction.

FIG. 7A is a perspective view of a cover 110 seen from downstream in the mounting direction M. FIG. 7B is a perspective view of the cover 110 seen from upstream in the mounting direction M.

As illustrated in FIGS. 3A to 4B, the mounting unit 106 includes a main body base unit 2. The main body base unit 2 includes a first frame 107, a second frame 117, and the cover 110. The cover 110 and the second frame 117 are fixed to the first frame 107.

As illustrated in FIGS. 7A and 7B, the cover 110 includes a portion to be engaged 110*h* that is engaged with a positioning portion 107*a* of the first frame 107 so that the cover 110 will not rotate about a rotation axis B with respect to the first frame 107. The cover 110 has a cutout 110*k* in its downstream side in the mounting direction M, i.e., in the bottom. The cutout 110*k* has a first restriction surface 110*c* and a second restriction surface 110*d*.

The first restriction surface 110*c* and the second restriction surface 110*d* are opposed to each other circumferentially about the rotation axis B.

The first frame 107, the cover 110, and the second frame 117 may be integrated instead of being separate members. As illustrated in FIGS. 3A and 3B, the second frame 117 has an apparatus-side opening 117*a*. The apparatus-side opening 117*a* communicates with the toner accommodation unit 36 (see FIG. 1A) of the developing container 32.

The operation lever 108 and the apparatus-side shutter 109 are both attached to the main body base unit 2 rotatably about the rotation axis B. The first frame 107 includes the positioning portion 107*a*. The positioning portion 107*a* protrudes from the inner peripheral surface of the first frame 107 about the rotation axis B inward in a radial direction r of an imaginary circle VC about the rotation axis B.

The operation lever 108 serving as an operation unit includes a drive-transmitting portion 108*a* and an operation portion 108*b*. The user can rotate the operation lever 108 about the rotation axis B with respect to the main body base unit 2 by operating the operation portion 108*b*. As illustrated in FIG. 3A, the drive-transmitting portion 108*a* is a protrusion protruding from the inner peripheral surface of the operation lever 108 about the rotation axis B inward in the radial direction r of the imaginary circle VC about the rotation axis B.

As illustrated in FIGS. 6A and 6B, the apparatus-side shutter 109 serving as a main body shutter includes an inner peripheral surface 109*h*, an acceptance port 109*a* that is formed in the inner peripheral surface 109*h* and accepts toner from the toner pack 100, and a bottom surface 109*b*. The apparatus-side shutter 109 further includes a center boss 109*d*, a pack contact surface 109*g*, and a rib to be restricted 109*c* that are located at the bottom surface 109*b*, and a drive-transmitted portion 109*e* disposed on the inner peripheral surface 109*h*.

As illustrated in FIG. 6A, the drive-transmitted portion 109*e* is a protrusion protruding inward in the radial direction r of the imaginary circle VC about the rotation axis B. An apparatus-side seal 111 is attached to the inner peripheral surface 109*h* so that the acceptance port 109*a* is surrounded (see FIG. 4B).

The apparatus-side shutter 109 is configured to take a shut position and an open position with respect to the main body base unit 2. More specifically, as illustrated in FIGS. 6A and 6B, the apparatus-side shutter 109 rotates from the shut position to the open position in the direction of the arrow K, and from the open position to the shut position in the direction of the arrow L.

The directions of the arrows K and L are the same as those of a pack-side shutter 103. With the apparatus-side shutter 109 at the shut position, the acceptance port 109*a* is shut by the apparatus-side seal 111 and the cover 110. With the apparatus-side shutter 109 at the open position, the acceptance port 109*a* is not covered by the cover 110 and opened. In other words, the acceptance port 109*a* does not communicate with the apparatus-side opening 117*a* of the second frame 117 when the apparatus-side shutter 109 is at the shut position, and communicates with the apparatus-side opening 117*a* of the second frame 117 when the apparatus-side shutter 109 is at the open position.

In FIGS. 4A and 5A, the apparatus-side shutter 109 is at the shut position, and the acceptance port 109*a* of the apparatus-side shutter 109 here does not communicate with the apparatus-side opening 117*a* of the second frame 117. In FIGS. 4B and 5B, the apparatus-side shutter 109 is at the open position, and the acceptance port 109*a* of the apparatus-side shutter 109 here communicates with the apparatus-side opening 117*a* of the second frame 117. The movement of the apparatus-side shutter 109 to the open position enables replenishment (supply) of the toner accommodation unit 36 of the developing container 32 with toner from the toner pack 100 via the acceptance port 109*a*.

Since the operation lever 108 and the apparatus-side shutter 109 are not coupled in terms of driving, the apparatus-side shutter 109 does not rotate if the operation lever 108 is operated without mounting the toner pack 100.

As illustrated in FIGS. 6A to 7B, the apparatus-side shutter 109 is configured to be rotatable about the center boss 109*d* with a large-diameter portion 109*dl* of the center boss 109*d* engaged with a cylindrical portion 110*j* of the cover 110.

Here, the rib to be restricted 109*c* disposed on the bottom surface 109*b* of the apparatus-side shutter 109 is located between the first restriction surface 110*c* and the second restriction surface 110*d* of the cover 110. The apparatus-side shutter 109 can thus rotate only within the range where the rib to be restricted 109*c* can move between the first restriction surface 110*c* and the second restriction surface 110*d*. In other words, the rotation range of the apparatus-side shutter 109 is restricted between the shut position and the open position by the first and second restriction surfaces 110*c* and 110*d* of the cover 110.

For example, in a state where the rib to be restricted 109*c* is in contact with the first restriction surface 110*c*, the apparatus-side shutter 109 located at the shut position is unable to be rotated in the direction of the arrow L, i.e., the direction opposite to that toward the open position.

[Configuration of Developer Container]

Next, a basic configuration of a developer container 800 including the toner pack 100 will be described with reference to FIGS. 8A to 9B. The toner pack 100 is mounted on the mounting unit 106 described above.

Figure 8A:
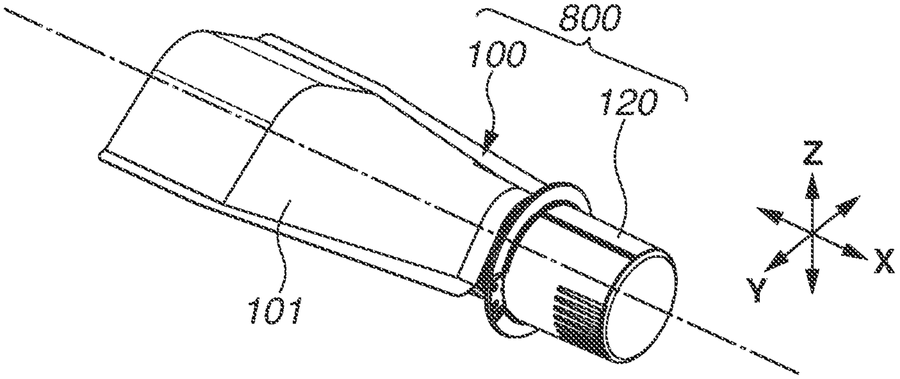
FIG. 8A is a perspective view illustrating a developer container.
Figure 8B:
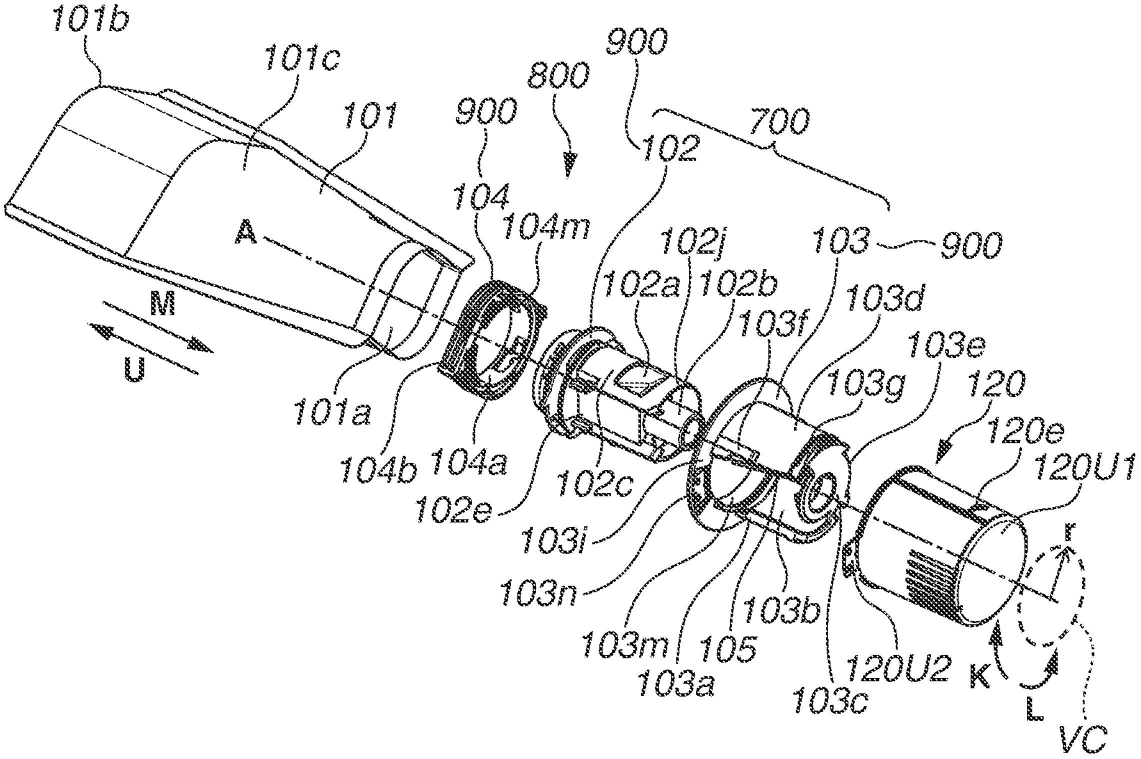
FIG. 8B is an exploded perspective view illustrating the developer container.

FIG. 8A is a perspective view illustrating the developer container 800. FIG. 8B is an exploded perspective view illustrating the developer container 800.

In the present embodiment, direction X illustrated in FIGS. 8A and 8B (i.e., direction extending along an axial direction D1 of a rotation axis A) will be referred to as a "height direction" of the toner pack 100. Direction Y orthogonal to the height direction (X) will be referred to as a "width direction" of the toner pack 100. Direction Z orthogonal to the height direction (X) and the width direction (Y) will be referred to as a "thickness direction" of the toner pack 100. As can be seen from FIGS. 8A and 8B, in the present embodiment, the size of the toner pack 100 satisfies the relationship that the height direction (X)>the width direction (Y)>the thickness direction (Z).

Figure 9A:
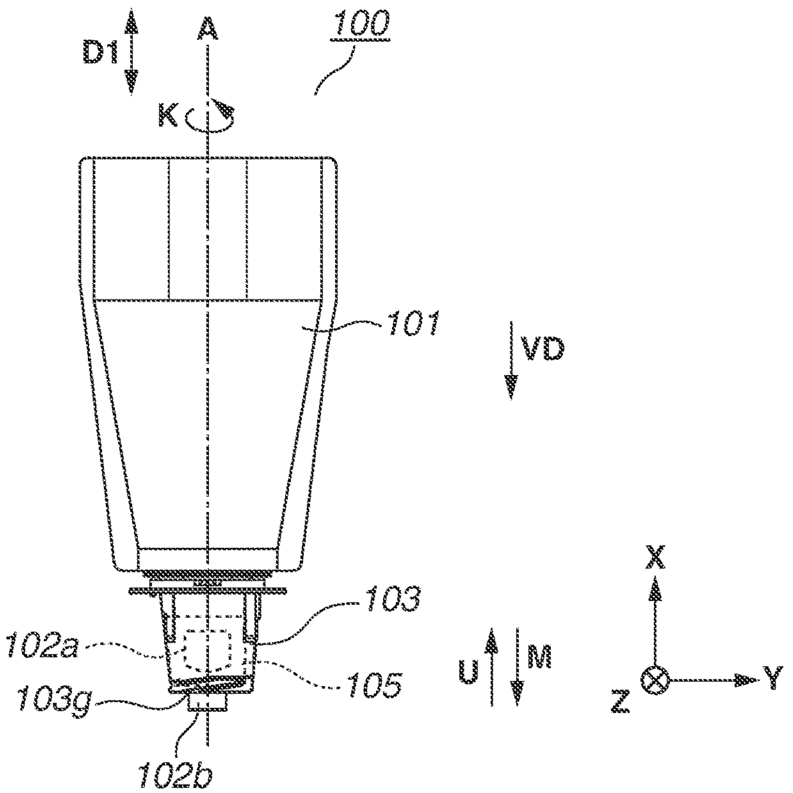
FIG. 9A is a side view of a toner pack when a pack-side shutter is at a shut position.
Figure 9B:
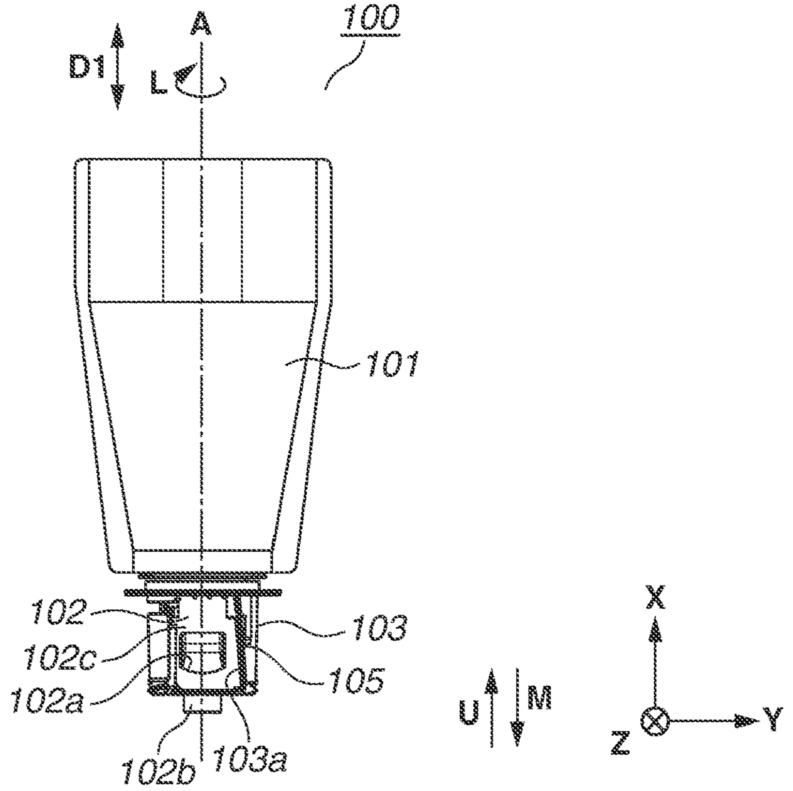
FIG. 9B is a side view of the toner pack when the pack-side shutter is at an open position.

FIG. 9A is a side view of the toner pack 100 when the pack-side shutter 103 is at a shut position. FIG. 9B is a side view of the toner pack 100 when the pack-side shutter 103 is at an open position. In other words, FIGS. 9A and 9B illustrate the states of the toner pack 100 seen in the thickness direction (Z).

As illustrated in FIGS. 8A and 8B, the developer container 800 serving as a container includes the toner pack 100 and a cap 120. Although details are omitted in FIGS. 8A and 8B, "markings" to be described below (see FIGS. 21A to 21E) are formed to protrude from the outer peripheral surface of the cap 120.

The developer container 800 and the image forming apparatus 1 constitute the image forming system 1000 (see FIG. 1A). The toner pack 100 includes a pouch 101 accommodating contents such as toner, an opening member 104 bonded to an opening 101*a* of the pouch 101, and a unit to be mounted 700 to be mounted on the mounting unit 106.

The unit to be mounted 700 that is an end unit includes a nozzle 102 bonded to the opening member 104, and the pack-side shutter 103. The cap 120 is detachably attached to the unit to be mounted 700. Details will be described below.

The nozzle 102, the pack-side shutter 103, and the opening member 104 constitute a communication member 900 to be described below.

The pouch 101 serving as an accommodation unit is flexible and located at one end of the toner pack 100 in the axial direction D1 that is the direction of the rotation axis A of the pack-side shutter 103. When the toner pack 100 is mounted on the mounting unit 106, the rotation axis A agrees with the rotation axis B of the apparatus-side shutter 109. Hereinafter, both the axial directions of the rotation axes A and B will therefore be referred to as the axial direction D1.

The nozzle 102 and the pack-side shutter 103 are located at the other end of the toner pack 100 in the axial direction D1. The pouch 101 is formed by laminating flexible polypropylene sheets, for example, and has a bag-like shape with one end open through the opening 101*a*. The pouch 101 may be a resin bottle or a paper or plastic container.

The opening member 104 serving as an intermediate member is an annular resin member having a through hole 104*a*, and is fixed to the opening 101*a* of the pouch 101. In the present embodiment, the opening member 104 is made of polypropylene resin and has a greater thickness and higher rigidity than the pouch 101 made of flexible sheets.

In other words, the pouch 101 has a first rigidity, and the opening member 104 has a second rigidity higher than the first rigidity. The opening 101*a* of the flexible pouch 101 can thus be maintained open.

The opening member 104 is bonded to the nozzle 102 and has the through hole 104*a*. In other words, the opening member 104 connects the pouch 101 and the unit to be mounted 700 so that the pouch 101 and the unit to be mounted 700 including the nozzle 102 communicate with each other.

The opening member 104 further includes a pair of extending portions 104*b* on its outer peripheral surface. The extending portions 104*b* extend away from the rotation axis A in the radial direction r of the imaginary circle VC about the rotation axis A. The pair of extending portions 104*b* is located in 180° different phases from each other in the circumferential direction about the rotation axis A.

As described above, the outer peripheral surface of the opening member 104 is not a uniform circular peripheral surface about the rotation axis A. The user can thus stably hold the opening member 104 by gripping the extending portions 104*b*. In other words, the extending portions 104*b* function as anti-slip members to prevent the user's hand from slipping in the direction of rotation about the rotation axis A.

The nozzle 102 serving as a discharge portion is bonded to the opening member 104. Here, any bonding method may be used. Examples of the bonding method include methods using various adhesives such as a hot-melt adhesive, and a method for thermally welding the through hole 104*a* of the opening member 104 to the outer periphery of the nozzle 102. Any bonding method may be used between the pouch 101 and the opening member 104 as well.

The nozzle 102 has a side surface 102*c* serving as an external surface extending along the rotation axis A. A discharge port 102*a* and a recess 102*e* are formed in the side surface 102*c*. The discharge port 102*a* is configured to communicate with the inside of the pouch 101. The recess 102*e* is located at a position different from the discharge port 102*a* in the direction of rotation of the pack-side shutter 103.

The nozzle 102 is configured so that the toner accommodated in the pouch 101 is discharged out of the toner pack 100 via the discharge port 102*a* when the user compresses the pouch 101 to reduce the volume of the pouch 101. In other words, the interior of the nozzle 102 is configured to allow passage of the toner (contents) toward the discharge port 102*a*.

The nozzle 102 may be integrated with the opening member 104. A seal may be disposed between the pouch 101 and the discharge port 102*a* of the nozzle 102, and the pouch 101 and the discharge port 102*a* may be configured to communicate when the seal is removed.

The pack-side shutter 103 serving as a shutting member is located outside the side surface 102*c* of the nozzle 102. The pack-side shutter 103 is disposed rotatably about the rotation axis A extending along the axial direction D1, and has an opening 103*a*.

Specifically, an inner peripheral surface 103*m* of the pack-side shutter 103 is slidably supported by an annular rib 104*m* of the opening member 104. The pack-side shutter 103 is located outside the side surface 102*c* in the radial direction r of the imaginary circle VC about the rotation axis A and can shut the discharge port 102*a*. The side surface 102*c* is an arc-shaped curved surface convex outward in the radial direction r.

The inner surface of the pack-side shutter 103, i.e., the surface opposed to the side surface 102*c* is a surface curved along the side surface 102*c* of the nozzle 102. A substantially rectangular pack-side seal 105 is attached to the inner surface.

The pack-side shutter 103 is configured to be rotatable about the rotation axis A between a shut position (position illustrated in FIG. 9A) where the pack-side seal 105 shuts the discharge port 102*a* of the nozzle 102 and an open position (position illustrated in FIG. 9B) where the pack-side seal 105 opens the discharge port 102*a*. When the pack-side shutter 103 is at the open position, the discharge port 102*a* of the nozzle 102 is exposed from the opening 103*a* formed in the pack-side shutter 103. In other words, the opening 103*a* of the pack-side shutter 103 is located to open the discharge port 102*a* when the pack-side shutter 103 is at the open position.

If the pack-side shutter 103 at the shut position illustrated in FIG. 9A that is a first shut position is rotated in the direction of the arrow K about the rotation axis A, the pack-side shutter 103 reaches the open position illustrated in FIG. 9B that is a first open position. Conversely, if the pack-side shutter 103 at the open position is rotated in the direction of the arrow L, the pack-side shutter 103 reaches the shut position.

In other words, the direction of the arrow K that is a first direction of rotation is a direction from the shut position to the open position about the rotation axis A. The direction of the arrow L that is a second direction of rotation is a direction from the open position to the shut position about the rotation axis A. During the rotating operation of the pack-side shutter 103, the pack-side shutter 103 slides on the side surface 102*c* of the nozzle 102 via the pack-side seal 105.

Next, a detailed configuration of the nozzle 102 and the pack-side shutter 103 will be described with reference to FIGS. 8A to 10B.

Figure 10A:
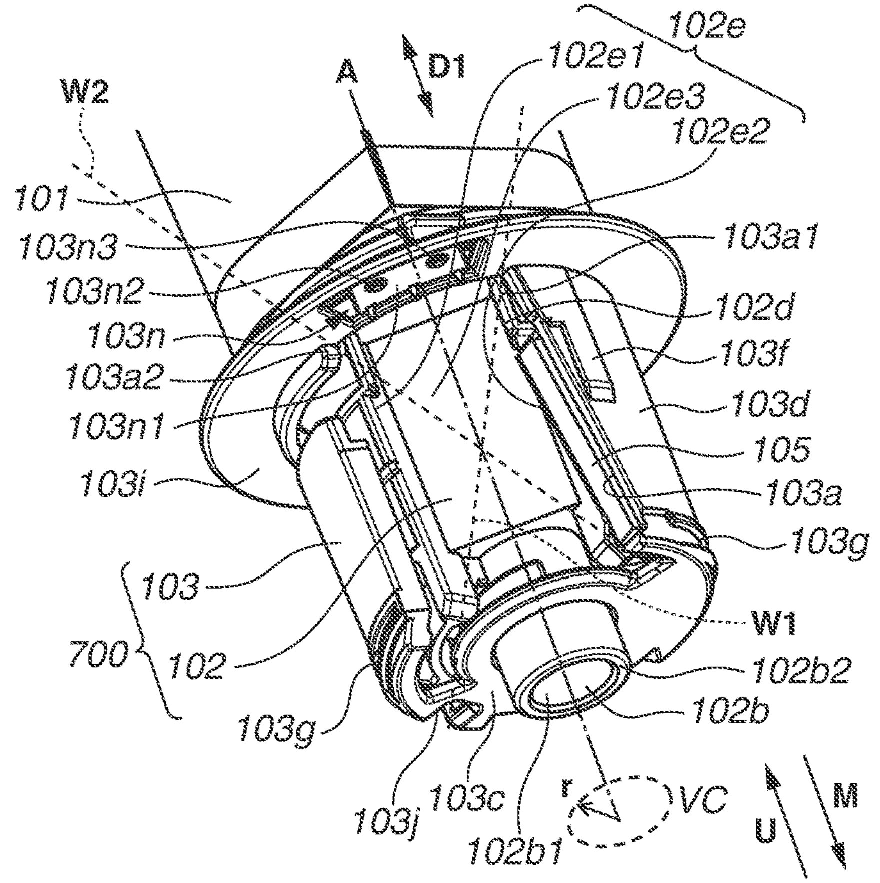
FIG. 10A is a perspective view illustrating a unit to be mounted when the pack-side shutter is at the shut position.
Figure 10B:
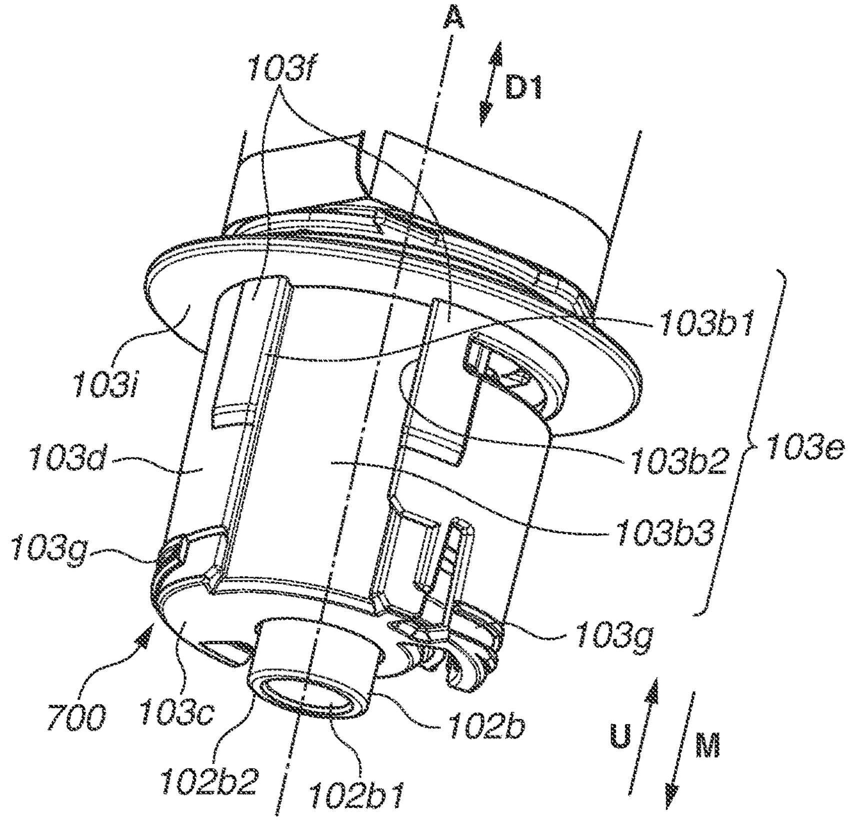
FIG. 10B is another perspective view illustrating the unit to be mounted when the pack-side shutter is at the shut position.

FIG. 10A is a perspective view illustrating the unit to be mounted 700 when the pack-side shutter 103 is at the shut position. FIG. 10B is another perspective view illustrating the unit to be mounted 700 when the pack-side shutter 103 is at the shut position.

As illustrated in FIGS. 8A to 10B, the nozzle 102 includes portions to be positioned 102*d* having surfaces opposed to each other in the circumferential direction about the rotation axis A. The portions to be positioned 102*d* are engaged with the positioning portion 107*a* (FIG. 4A) of the first frame 107 when the toner pack 100 is mounted on the mounting unit 106. This determines the position of the nozzle 102 with respect to the first frame 107 (main body base unit 2) in the direction of rotation about the rotation axis A.

Surfaces 102*e*1 and 102*e*2 are located downstream of the portions to be positioned 102*d* in the mounting direction M along the direction of the rotation axis A. A side surface 102*e*3 is located between the surfaces 102*dl* and 102*d*2 and between the surfaces 102*e*1 and 102*e*2. The side surface 102*e*3 is recessed from the side surface 102*c* inward in the radial direction r. The portions to be positioned 102*d*, the surfaces 102*e*1 and 102*e*2, and the side surface 102*e*3 constitute the recess 102*e*.

The opening 103*a* is formed in a side surface 103*d* of the pack-side shutter 103.

The side surface 103*d* extends along the rotation axis A. As illustrated in FIG. 10A, when the pack-side shutter 103 is at the shut position, at least a part of the recess 102*e* of the nozzle 102 is exposed from the opening 103*a*. The purpose is to engage the portions to be positioned 102*d* of the recess 102*e* with the positioning portion 107*a* when the toner pack 100 is mounted on the mounting unit 106 with the pack-side shutter 103 located at the shut position.

The pack-side shutter 103 further includes a drive-transmitted portion 103*e* on the other side of the rotation axis A from the opening 103*a*. The drive-transmitted portion 103*e* is located opposite to the recess 102*e* of the nozzle 102 across the rotation axis A when the pack-side shutter 103 is at the shut position.

The drive-transmitted portion 103*e* has a surface 103*b*1, a surface 103*b*2, and a side surface 103*b*3, and can be engaged with the drive-transmitting portion 108*a* of the operation lever 108 to be described below. The side surface 103*b*3 is located between the surfaces 103*b*1 and 103*b*2, and recessed from the side surface 103*d* inward in the radial direction r.

A flange portion 103*i* extending from the side surface 103*d* outward in the radial direction r, i.e., away from the rotation axis A is disposed on the upstream end of the pack-side shutter 103 in the mounting direction M. A cap fixing portion 103*n* serving as a portion to be fixed to be described below is disposed on the flange portion 103*i*.

Next, a protrusion 102*b* of the nozzle 102 will be described in detail.

As illustrated in FIGS. 9A and 9B, the toner pack 100 is oriented with the second end (nozzle 102 side) of the toner pack 100 below the first end (pouch 101 side). Alternatively, the toner pack 100 is oriented so that at least a part of the nozzle 102 is located below the pouch 101 and the rotation axis A is parallel to (a direction VD1 along) a vertical (gravitational) direction VD.

In such an orientation, the toner pack 100 is mounted on the mounting unit 106 of the image forming apparatus 1. Here, in FIGS. 9A to 10B, the mounting direction M is downward, and an unmounting direction U upward.

The pack-side shutter 103 has an end face 103*c* that is the lower end face in the vertical direction VD and constitutes the bottom of the pack-side shutter 103. The nozzle 102 has the protrusion 102*b* protruding downstream in the mounting direction M, i.e., downward from the end face 103*c* of the pack-side shutter 103.

The protrusion 102*b* is a cylindrical portion (portion having a cylindrical shape) about the rotation axis A.

The protrusion 102*b* has a protrusion end face 102*b*2 that is the lower end face. The protrusion end face 102*b*2 has a hole having an inner peripheral surface 102*b*1 about the rotation axis A.

As illustrated in FIG. 8B, the protrusion 102*b* protrudes downward from a lower end face 102*j* of the nozzle 102. In the present embodiment, the end face 103*c* of the pack-side shutter 103 and the end face 102*j* of the nozzle 102 are end faces perpendicular to the rotation axis A. However, this is not restrictive.

These surfaces can be any surfaces extending in a direction intersecting the rotation axis A when seen in a direction perpendicular to the rotation axis A. The protrusion 102*b* does not necessarily need to be disposed on the nozzle 102, either. [Operation of Operation Lever]

If the user mounts the toner pack 100 with the cap 120 removed on the mounting unit 106 and then operates the operation lever 108, the apparatus-side shutter 109 and the pack-side shutter 103 open together so that the toner can be replenished into the apparatus main body 400 from the toner pack 100.

In mounting the toner pack 100 on the mounting unit 106, the user initially removes a cap main body portion 120U1 (cap main body) from the unit to be mounted 700 of the toner pack 100. The drive-transmitted portion 103*e*, the protrusion 102*b*, and the portions to be positioned 102*d* of the unit to be mounted 700 (see FIGS. 10A and 10B) are thereby exposed. In a state of the cap main body portion 120U1 removed, the unit to be mounted 700 of the toner pack 100 can be mounted on the mounting unit 106 of the image forming apparatus 1. Note that the cap main body portion 120U1 can be attached to the unit to be mounted 700 of the toner pack 100 again.

Figure 11:
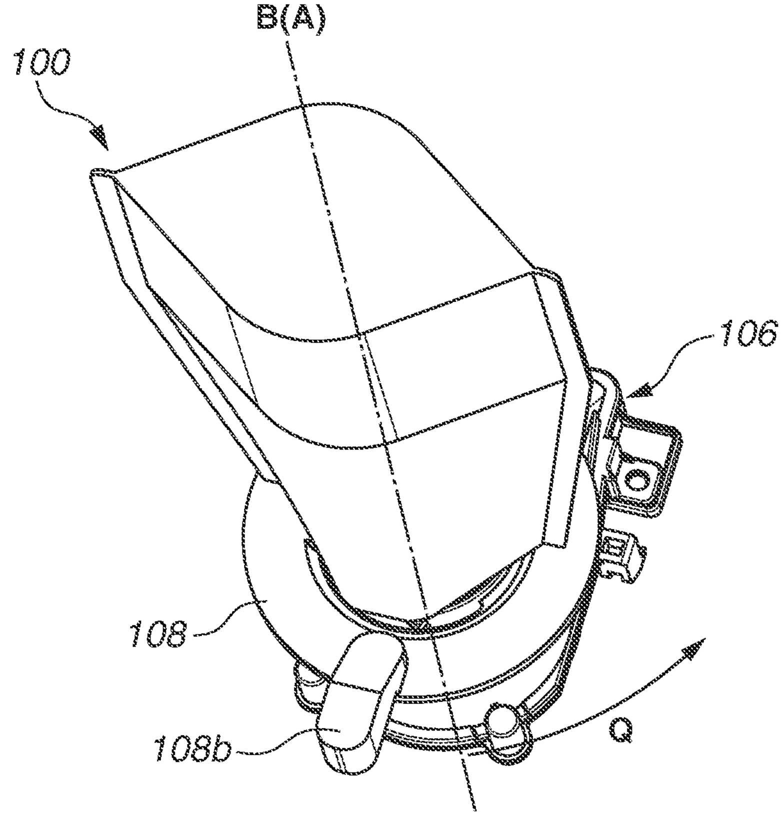
FIG. 11 is a perspective view illustrating the operation lever located at the closed position and the toner pack.
Figure 12:
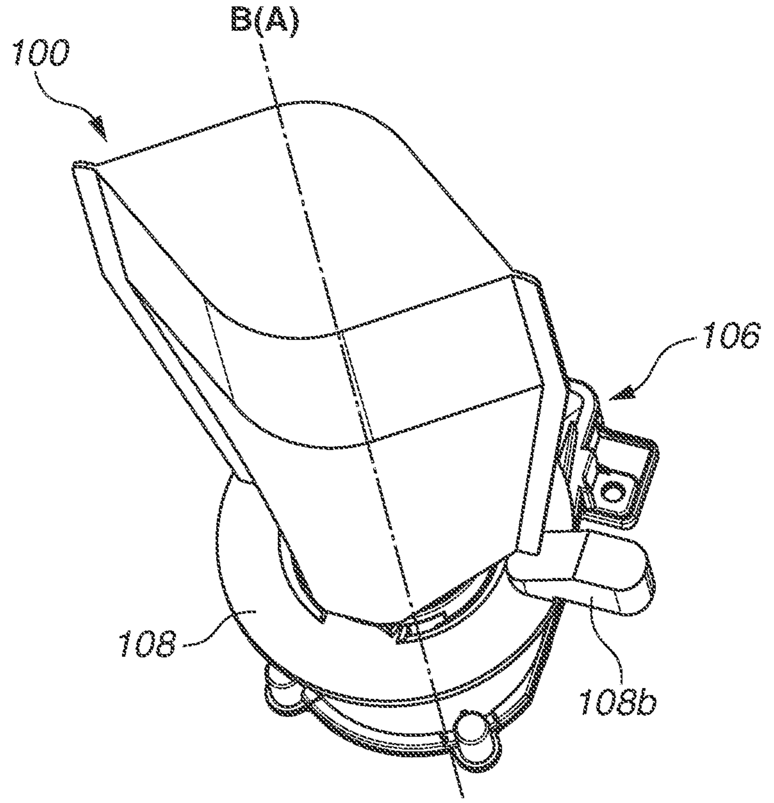
FIG. 12 is a perspective view illustrating the operation lever located at the open position and the toner pack.

Specifically, FIG. 11 is a perspective view illustrating the operation lever 108 at the closed position and the toner pack 100. FIG. 12 is a perspective view illustrating the operation lever 108 at the open position and the toner pack 100.

As described above, in the state where the toner pack 100 is mounted on the mounting unit 106, the operation lever 108, the pack-side shutter 103, and the apparatus-side shutter 109 can integrally rotate about the rotation axis B with respect to the main body base unit 2 and the nozzle 102. In the state where the toner pack 100 is mounted on the mounting unit 106 and the operation lever 108 is at the closed position, the discharge port 102*a* is shut by the pack-side shutter 103, the pack-side seal 105, and the apparatus-side shutter 109. With such a configuration, the toner in the pouch 101 is therefore unable to reach the apparatus-side opening 117*a* of the second frame 117.

As illustrated in FIGS. 11 and 12, if the operation lever 108 is rotated from the shut position to the open position in the direction of the arrow Q with the toner pack 100 mounted on the mounting unit 106, the pack-side shutter 103 and the apparatus-side shutter 109 rotate from the shut position to the open position.

More specifically, the drive-transmitting portion 108*a* of the operation lever 108 presses the surface 103*b*1 of the pack-side shutter 103. The pack-side shutter 103 is thereby rotated from the shut position to the open position along with the operation lever 108.

In other words, the engagement of the drive-transmitting portion 108*a* with the surface 103*b*1 rotates the pack-side shutter 103 from the shut position to the open position as the operation lever 108 rotates. Moreover, the surface 103*b*2 of the pack-side shutter 103 rotated from the shut position to the open position presses the drive-transmitted portion 109*e* of the apparatus-side shutter 109.

As a result, the apparatus-side shutter 109 is rotated from the shut position to the open position along with the pack-side shutter 103. In other words, the engagement of the surface 103*b*2 with the drive-transmitted portion 109*e* rotates the apparatus-side shutter 109 integrally with the pack-side shutter 103 as the operation lever 108 rotates.

As a result, the pack-side shutter 103, the pack-side seal 105, and the apparatus-side shutter 109 move to open the discharge port 102*a* of the nozzle 102. In other words, the pouch 101 of the toner pack 100 and the toner accommodation unit 36 communicate via the discharge port 102*a*, the acceptance port 109*a*, and the apparatus-side opening 117*a*. The toner accommodation unit 36 of the developing container 32 is replenished with the toner in the pouch 101 via the discharge port 102*a*, the acceptance port 109*a*, and the apparatus-side opening 117*a* along with air by the user compressing the pouch 101.

If the replenishment of the developing container 32 with the toner from the toner pack 100 is completed, the user rotates the operation lever 108 from the open position to the shut position. As the operation lever 108 is rotated from the open position to the shut position, the drive-transmitting portion 108*a* of the operation lever 108 presses the surface 103*b*2 of the pack-side shutter 103.

As a result, the pack-side shutter 103 is rotated from the open position to the shut position along with the operation lever 108. Moreover, the side 103*b*1 of the pack-side shutter 103 rotated from the open position to the shut position presses the drive-transmitted portion 109*e* of the apparatus-side shutter 109. The apparatus-side shutter 109 is thereby rotated from the open position to the shut position along with the pack-side shutter 103.

In such a state, the user pulls the toner pack 100 out of the mounting unit 106, whereby the toner replenishment operation is completed. The user may attach the cap main body portion 120U1 to the toner pack 100 after the completion of the replenishment operation. The user may dispose of the cap main body portion 120U1 and the toner pack 100 separately.

[Cap]

(1) Configuration of Cap

Next, a configuration of the cap 120 attached to the toner pack 100 will be described with reference to FIGS. 8A, 8B, and 13A to 15C. Like FIGS. 8A and 8B, the "markings" (see FIGS. 21A to 21E) formed to protruded from the outer peripheral surface of the cap 120 are omitted in FIGS. 13A to 15C.

Figure 13A:
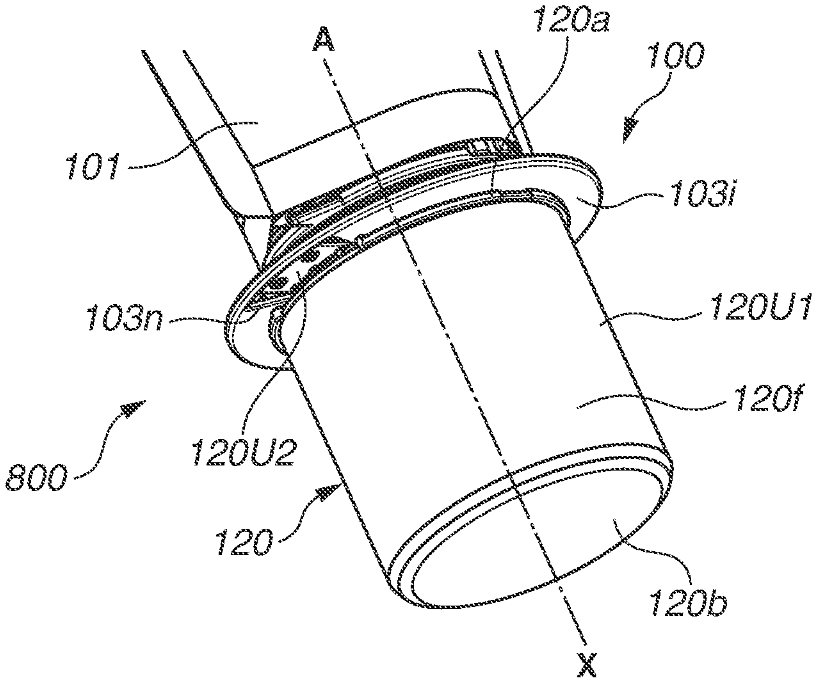
FIG. 13A is a perspective view illustrating the toner pack with a cap attached.
Figure 13B:
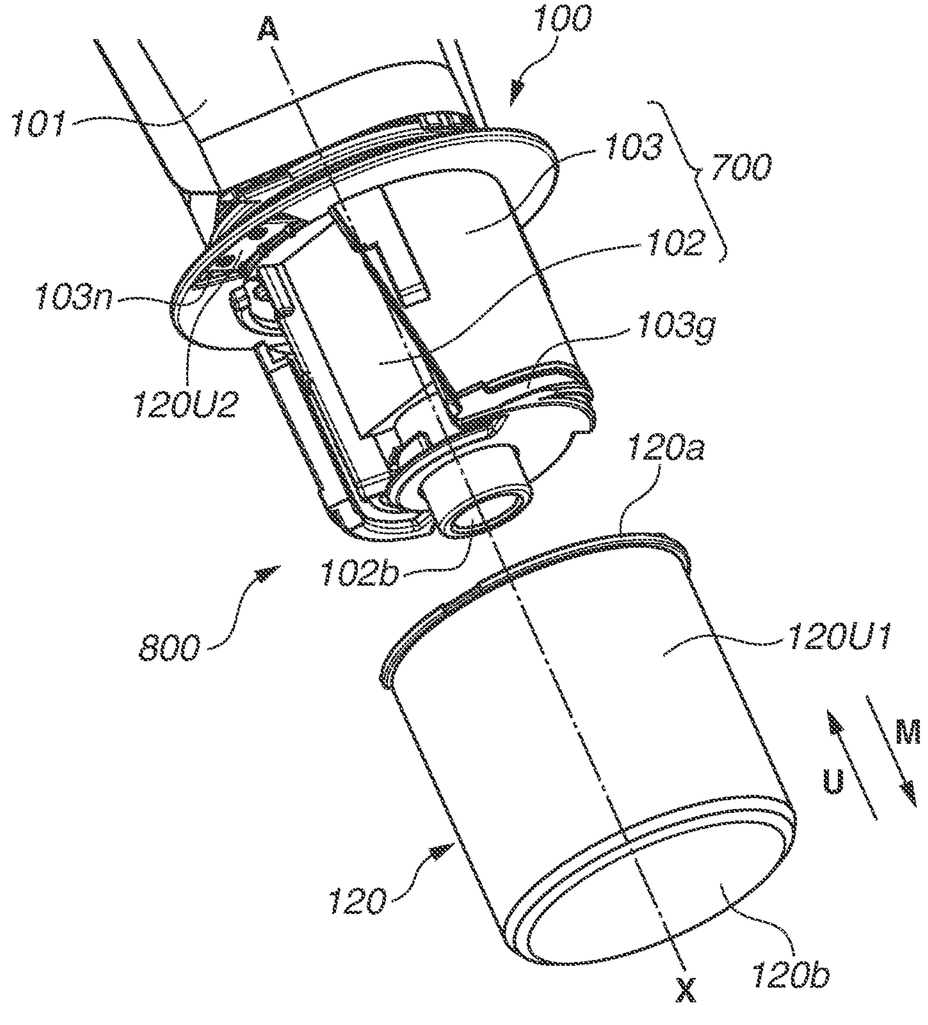
FIG. 13B is a perspective view illustrating the toner pack in a state of the cap detached.

FIG. 13A is a perspective view illustrating the toner pack 100 in a state of the cap 120 attached. FIG. 13B is a perspective view illustrating a state where the cap 120 is detached from the toner pack 100.

Figure 14A:
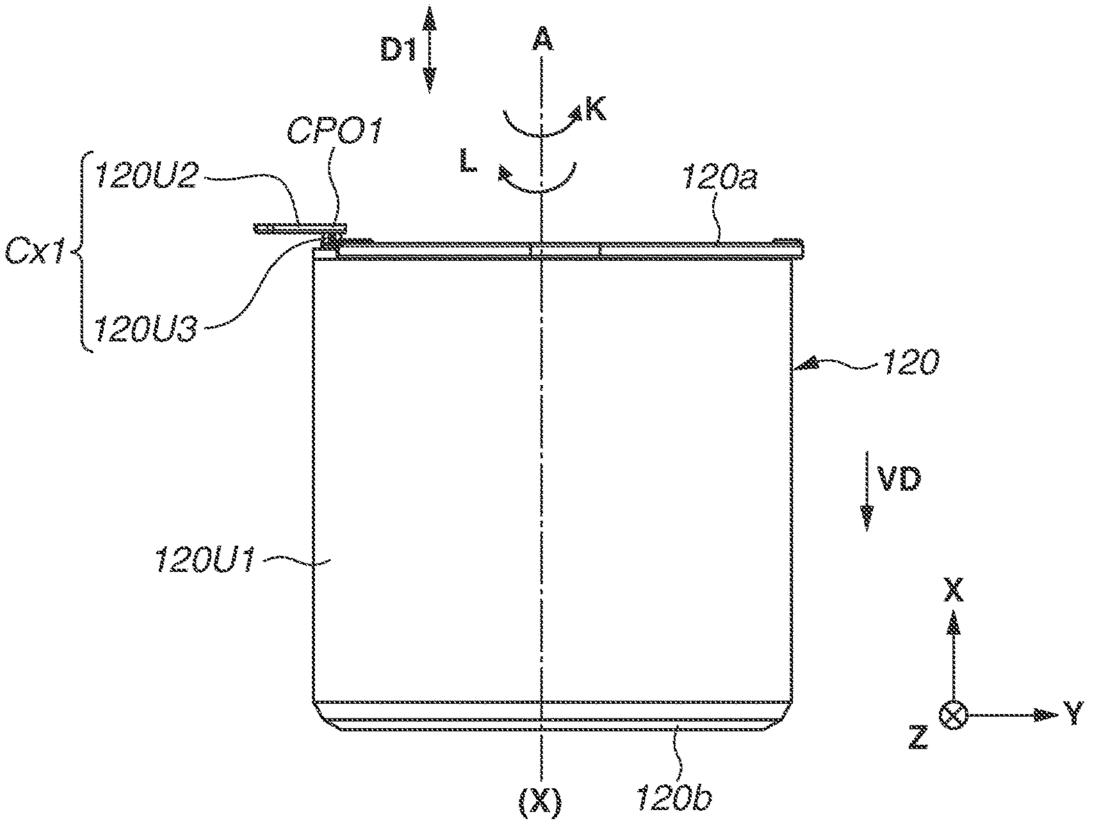
FIG. 14A is a front view of the cap.
Figure 14B:
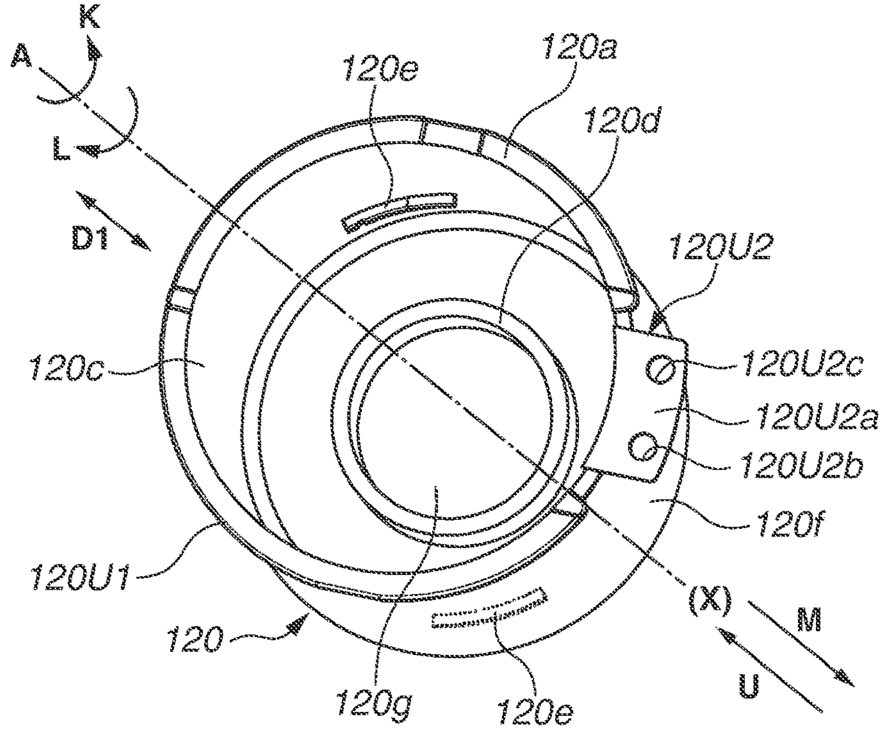
FIG. 14B is a perspective view of the cap.

FIG. 14A is a front view of the cap 120. More specifically, FIG. 14A illustrates the state of the cap 120 seen in the thickness direction (Z) of the pouch 101 (with reference to the state where the cap 120 is attached to the pouch 101). FIG. 14B is a perspective view of the cap 120.

Figure 15A:
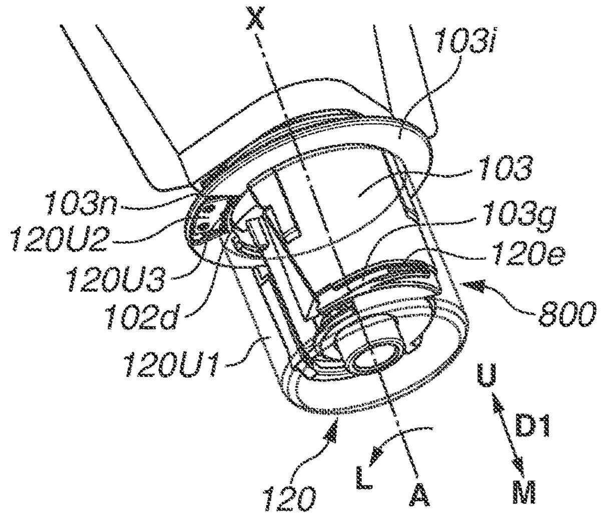
FIG. 15A is a perspective view illustrating a state where the cap is attached to the pack-side shutter.
Figure 15B:
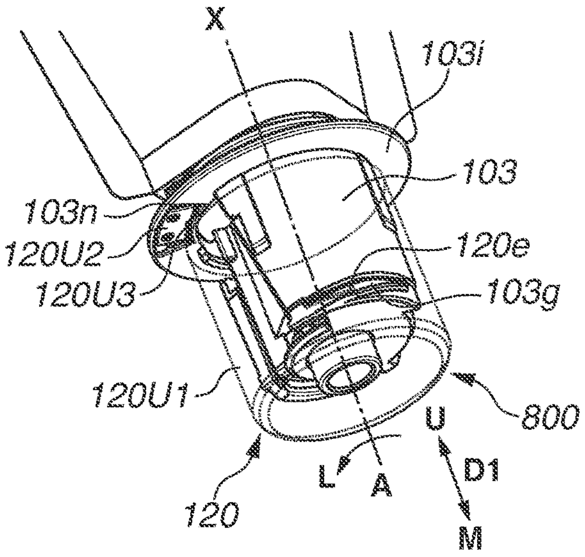
FIG. 15B is a perspective view illustrating a process of detaching the cap from the pack-side shutter.

FIG. 15A is a perspective view illustrating a state where the cap 120 is attached to the pack-side shutter 103. FIG. 15B is a perspective view illustrating the process of detaching the cap 120 from the pack-side shutter 103.

Figure 15C:
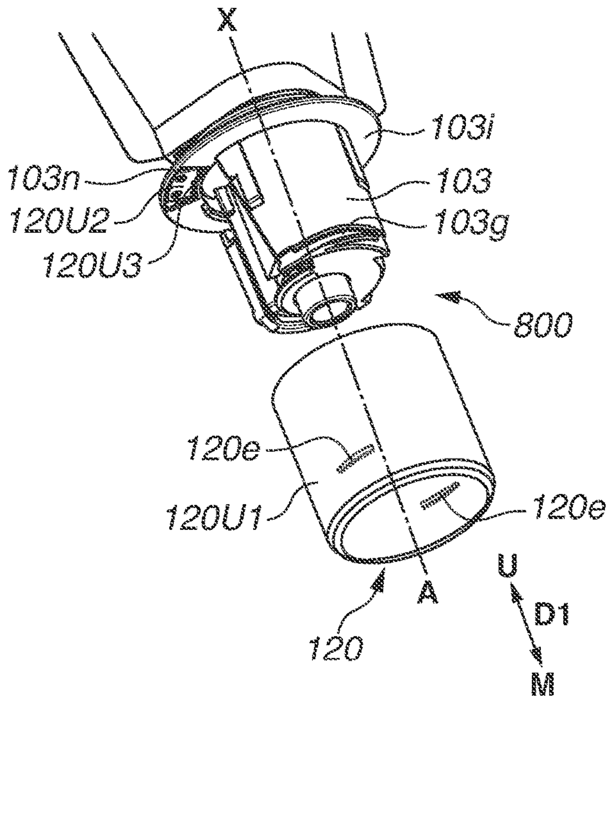
FIG. 15C is a perspective view illustrating a state where the cap is detached from the toner pack.

FIG. 15C is a perspective view illustrating a state where the cap 120 is detached from the toner pack 100. In FIGS. 15A and 15B, the outer shape of the cap 120 is illustrated by broken lines.

As illustrated in FIGS. 8A, 8B, and 13A to 14B, the cap 120 is attached to the unit to be mounted 700 including the nozzle 102 and the pack-side shutter 103 of the toner pack 100. The cap 120 attached to the unit to be mounted 700 covers at least a part of the unit to be mounted 700.

More specifically, the cap main body portion 120U1 to be described below of the cap 120 covers at least a part of the side surface 103*d* that is the outer side surface of the pack-side shutter 103. In the present embodiment, the cap 120 is attached to the pack-side shutter 103 by engagement with screw recesses 103*g* serving as container shutter-side screw portions disposed on the side surface 103*d* of the pack-side shutter 103.

The cap 120 includes the cap main body portion 120U1 (cap main body) serving as a main body portion, a fixing tab 120U2 (coupling portion) serving as a fixing portion, and connecting portions 120U3 (links) connecting the cap main body portion 120U1 and the fixing tab 120U2. The fixing tab 120U2 and the connecting portions 120U3 constitute a coupling unit Cx1. The coupling unit Cx1 is disposed on an edge portion CP01 at the opening side of the cap 120.

In the present embodiment, the cap main body portion 120U1 is formed in a circular cylindrical shape extending in the axial direction of the rotation axis A. However, this is not restrictive. Specifically, the cap main body 120U1 can be configured in any cylindrical shape extending in the axial direction of the rotation axis A. For example, the cap main body 120U1 may be configured in a polygonal cylindrical shape.

The cap main body portion 120U1 includes a cap opening 120*a*, a bottom surface 120*b*, an inner peripheral surface 120*c*, an annular rib 120*d*, screw protrusions 120*e*, and a cap outer peripheral surface 120*f* (outer peripheral surface). The cap opening 120*a* serving as an opening is located at one end in the axial direction D1 of the rotation axis A. The annular rib 120*d* extends downstream in the unmounting direction U, i.e., upward from a surface 120*g* opposite to the bottom surface 120*b*.

The surface 120*g* is opposed to the end face 103*c* of the pack-side shutter 103 and the protrusion 102*b* of the nozzle 102. The screw protrusions 120*e* serving as cap-side screw portions are disposed on the inner peripheral surface 120*c* extending along the rotation axis A, and protrude from the inter peripheral surface 120*c* inward in the radial direction r. The screw protrusions 120*e* can be engaged with the screw recesses 103*g* of the pack-side shutter 103 by rotating the cap main body portion 120U1 in the direction of the arrow K.

The cap main body portion 120U1 is attached to the pack-side shutter 103 by the engagement of the screw protrusions 120*e* with the screw recesses 103*g*. Note that the inner peripheral surface 120*c* of the cap 120 is configured to surround at least a part of the side surface 103*d* of the pack-side shutter 103. In the present embodiment, the inner peripheral surface 120*c* covers the entire side surface 103*d*.

Now, suppose that the developer container 800 including the toner pack 100 and the cap 120 is oriented with the rotation axis A parallel to the vertical direction VD and with the nozzle 102 below the pouch 101.

Such an orientation of the developer container 800 is similar to that when the toner pack 100 is mounted on the mounting unit 106. Here, the annular rib 120*d* extends upward from the surface 120*g*. The bottom surface 120*b* is the end face of the cap 120 in the mounting direction M and is a surface perpendicular to the rotation axis A. In a state of the cap 120 attached to the toner pack 100, the bottom surface 120*b* serves as the bottom surface of the developer container 800.

In the orientation illustrated in FIG. 14A, the bottom surface 120*b* extends horizontally. The developer container

800 is thus configured to be able to stand by itself with the bottom surface 120*b* in contact with the installation surface.

The cap 120 is attached to the pack-side shutter 103 of the unit to be mounted 700 so that the unit to be mounted 700 of the toner pack 100 is covered. Here, the annular rib 120*d* of the cap 120 is located outside the protrusion 102*b* of the nozzle 102 in the radial direction r and surrounds the protrusion 102*b*. In other words, the annular rib 120*d* that is a cap protrusion is located to not overlap the protrusion 102*b* when seen in the vertical direction (unmounting direction U or mounting direction M).

This can protect the protrusion 102*b* if the cap 120 undergoes external impact in transit. As will be described below, when the toner pack 100 is mounted on the mounting unit 106, the protrusion end face 102*b*2 of the protrusion 102*b* is abutted against the pack contact surface 109*g* (see FIG. 6A) of the apparatus-side shutter 109, whereby the toner pack 100 is positioned in the mounting direction M. Protecting the protrusion end face 102*b*2 with the cap 120 can thus improve the positioning accuracy of the toner pack 100 with respect to the mounting unit 106 in the mounting direction M.

As illustrated in FIGS. 8B, 13A, and 13B, in a state of the cap 120 attached to the toner pack 100, the cap opening 120*a* is located downstream of the portions to be positioned 102*d* and the drive-transmitted portion 103*e* in the unmounting direction U. In other words, the portions to be positioned 102*d* and the drive-transmitted portion 103*e* are covered and protected by the cap outer peripheral surface 120*f* that is the outer peripheral surface of the cap 120.

The portions to be positioned 102*d* are used to position the nozzle 102 to the first frame 107 (main body base unit 2) in the direction of rotation about the rotation axis A. The drive-transmitted portion 103*e* is engaged with the drive-transmitting portion 108*a* of the operation lever 108 and used to rotate the pack-side shutter 103 with the operation lever 108.

The unit to be mounted 700 of the toner pack 100 is separated from the inner peripheral surface 120*c* of the cap 120 except for the screw recesses 103*g*. The cap 120 thus protects the components of the unit to be mounted 700 from impact.

In a state of the cap 120 attached to the unit to be mounted 700 of the toner pack 100, toner leaking from the discharge port 102*a* of the nozzle 102, if any, is received by the cap 120. This prevents the user from directly touching the leaked toner, and can reduce adhesion of toner to the user's hands. If the contents accommodated in the toner pack 100 are liquid, the liquid leaked into the cap 120 dries up on the cap 120 with a lapse of time. This can reduce the adhesion of the contents to the user's hands.

The fixing tab 120U2 of the cap 120 is connected to the cap opening 120*a* of the cap main body portion 120U1 via the connecting portions 120U3, and located downstream of the cap main body portion 120U1 in the unmounting direction U. In a state where the cap 120 has never been detached from the unit to be mounted 700 before and the toner pack 100 is unused, the fixing tab 120U2 is fixed to the cap fixing portion 103*n* disposed on the flange portion 103*i* of the pack-side shutter 103.

In other words, the fixing tab 120U2 is fixed to only a part of the flange portion 103*i* in the circumferential direction of the imaginary circle VC about the rotation axis A.

Figure 19:
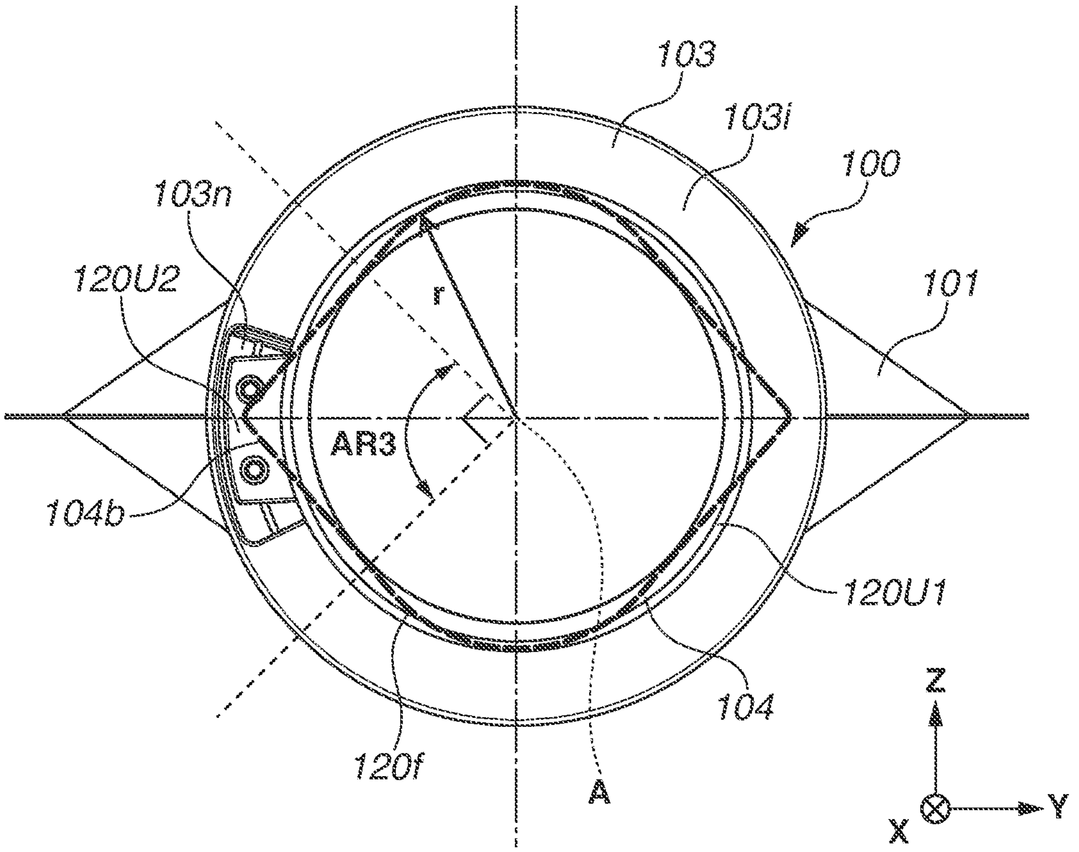
FIG. 19 is a diagram illustrating a positional relationship between extending portions of an opening member and a fixing tab.

More specifically, as illustrated in FIG. 19, when seen in the direction of the rotation axis A, the fixing tab 120U2 is located within an area AR3 where the circumferential angle about the rotation axis A is 90°.

Note that the fixing tab 120U2 is not limited to within the area AR3, and may be located within an area where the circumferential angle about the rotation axis A is 60°, 120°, or 180°, for example.

As illustrated in FIG. 15A, the screw protrusions 120*e* of the cap 120 are engaged (threadedly engaged) with the screw recesses 103*g* of the pack-side shutter 103. As illustrated in FIG. 10A, the cap fixing portion 103*n* includes a flat portion 103*n*1 and two protrusions 103*n*2 and 103*n*3 protruding from the flat portion 103*n*1 in the mounting direction M along the rotation axis A.

The protrusions 103*n*2 and 103*n*3 serving as second engagement portions are juxtaposed with a gap therebetween in the circumferential direction of the imaginary circle VC about the rotation axis A. The flat portion 103*n*1 extends along a plane orthogonal to the rotation axis A.

As illustrated in FIG. 14B, the fixing tab 120U2 includes a flat portion 120U2*a* serving as an adhesion surface extending along a plane orthogonal to the rotation axis A, and two holes 120U2*b* and 120U2*c* formed in the flat portion 120U2*a*. The holes 120U2*b* and 120U2*c* serving as first engagement portions extend along the rotation axis A. The holes 120U2*b* and 120U2*c* may be either through holes or bottomed holes each having a bottom at the downstream end in the mounting direction M.

The protrusions 103*n*2 and 103*n*3 of the cap fixing portion 103*n* can be engaged with the holes 120U2*b* and 120U2*c*. The fixing tab 120U2 is connected to the cap main body portion 120U1 via the connecting portions 120U3, whereby the cap 120 is fixed not to move relative to the pack-side shutter 103. The method for fixing the cap fixing portion 103*n* to the fixing tab 120U2 will be described below.

When detaching the cap 120 from the toner pack 100, as illustrated in FIG. 15B, the user rotates the cap 120 attached to the toner pack 100 in the direction of the arrow L (direction of rotation). As a result, the cap 120 is guided by the screw recesses 103*g* and the screw protrusions 120*e* to move in the axial direction D1, or more specifically, downstream in the mounting direction M with respect to the unit to be mounted 700.

As the cap 120 moves downstream in the mounting direction M, the connecting portions 120U3 connecting the fixing tab 120U2 and the cap main body portion 120U1 break. The connecting portions 120U3 is broken in a state where the fixing tab 120U2 is fixed to the cap fixing portion 103*n*, whereby the cap main body portion 120U1 is separated from the fixing tab 120U2.

As illustrated in FIG. 15C, the cap main body portion 120U1 is then rotated further in the direction of the arrow L. The screw recesses 103*g* and the screw protrusions 120*e* are thereby disengaged, and the cap main body portion 120U1 is detached from the unit to be mounted 700 of the toner pack 100.

(2) Detailed Configuration of Connecting Portions and Fixing Tab

Next, a detailed configuration of the connecting portions 120U3 and the fixing tab 120U2 will be described with reference to FIGS. 16 to 20B.

Figure 16:
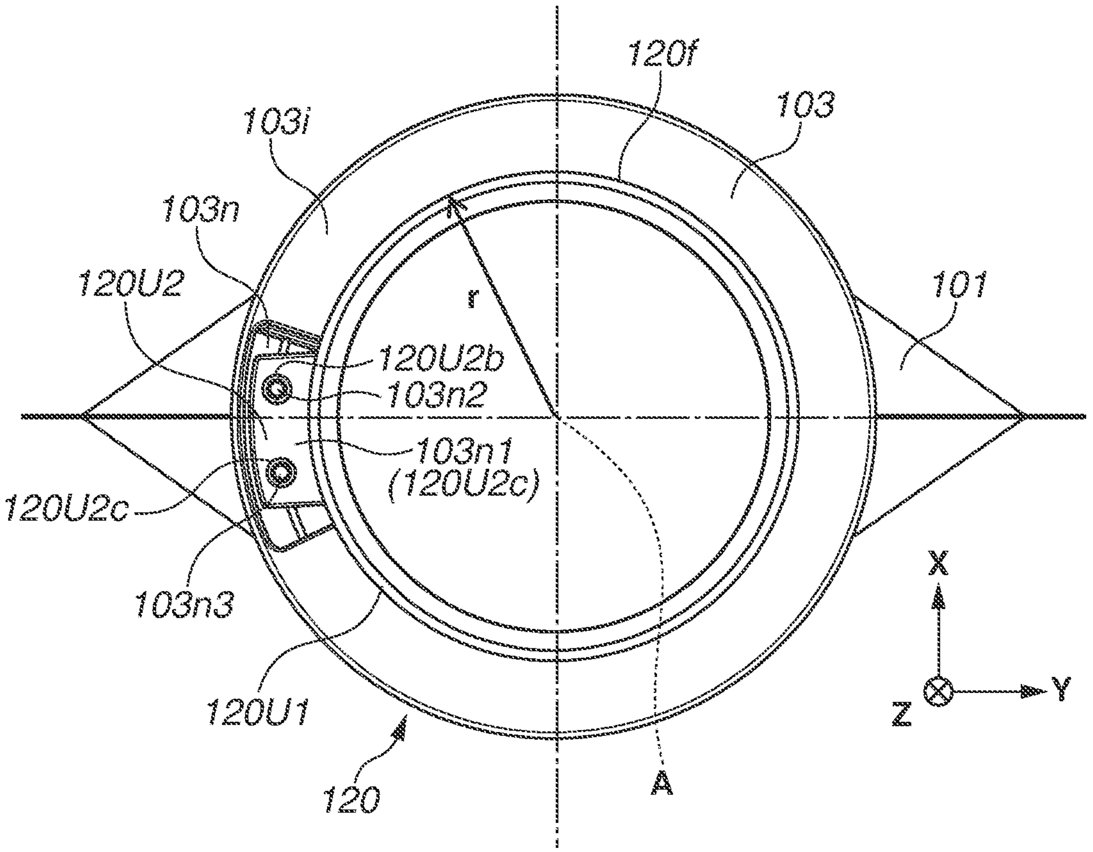
FIG. 16 is a view of the toner pack seen in an unmounting direction.

FIG. 16 is a view of the toner pack 100 seen in the unmounting direction U. More specifically, FIG. 16 illustrates the state of the toner pack 100 seen from the cap side along the height direction (X) of the pouch 101.

Figure 17A:
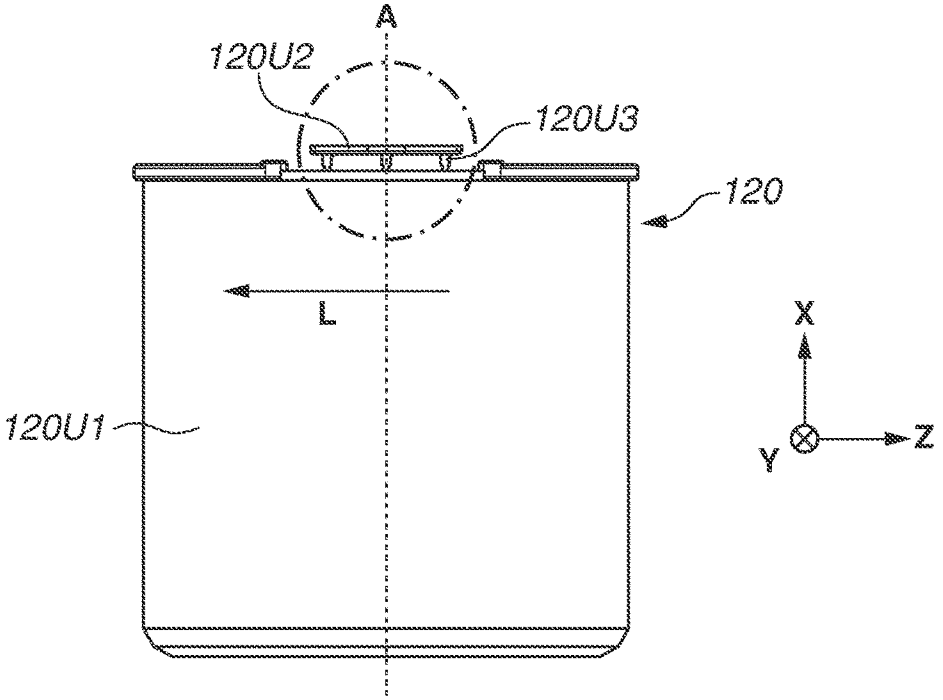
FIG. 17A is a front view of the cap.

FIG. 17A is a front view of the cap 120. More specifically, FIG. 17A illustrates the state of the cap 120 seen in the width direction (Y) of the pouch 101 (with reference to the state where the cap 120 is attached to the pouch 101). Like FIGS. 8A and 8B, the "markings" (see FIGS. 21A to 21E) formed to protrude from the outer peripheral surface 120*f* of the cap 120 are omitted in FIG. 17A.

Figure 17B:
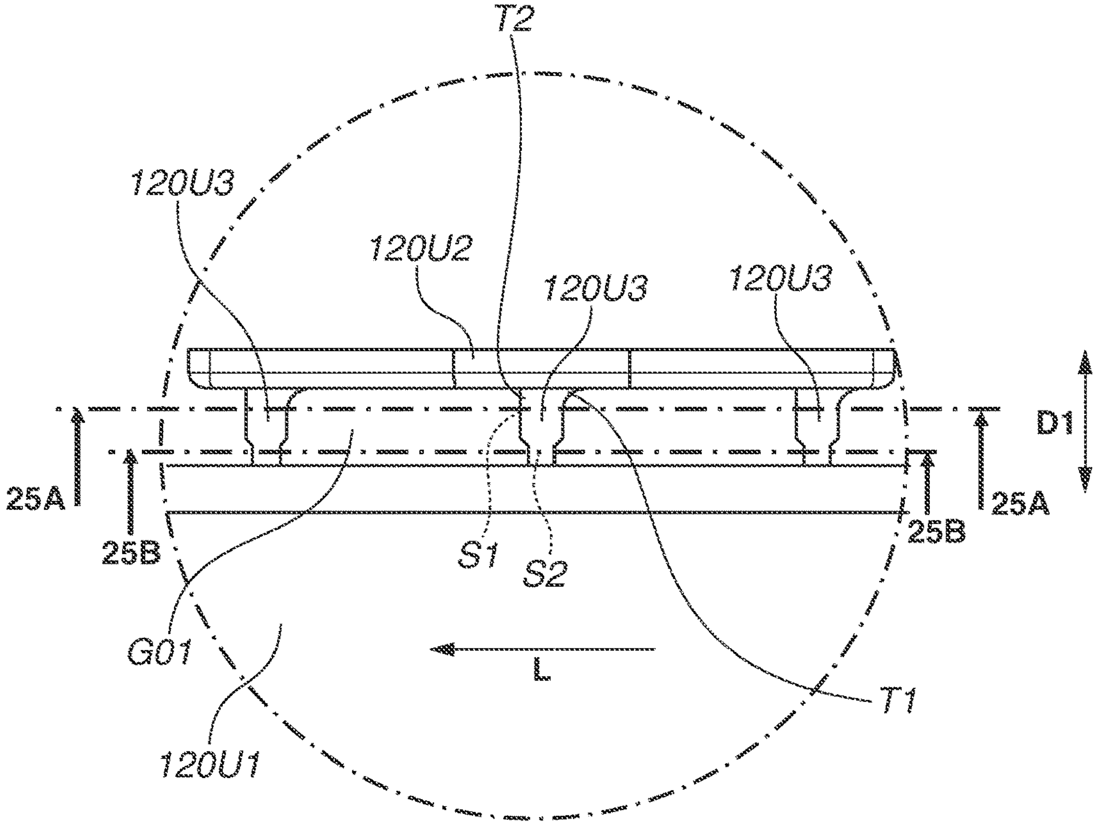
FIG. 17B is an enlarged view illustrating an area surrounded by a dot-dashed line in FIG. 17A.

FIG. 17B is an enlarged view illustrating the region surrounded by the dot-dashed line in FIG. 17A.

Figure 18A:
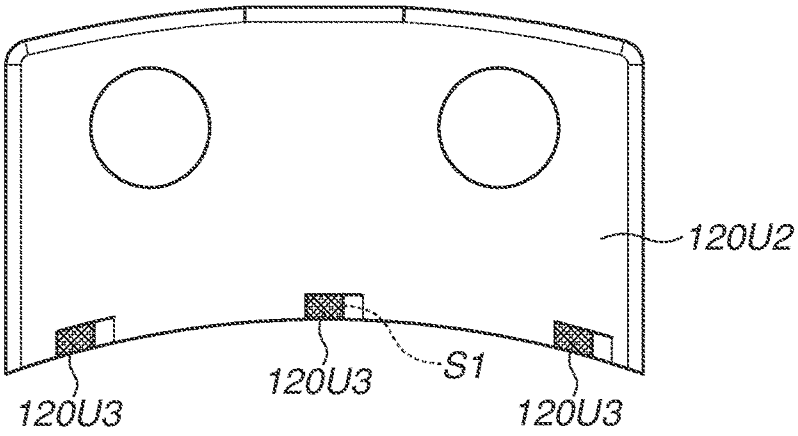
FIG. 18A is a sectional view illustrating a 25A-25A section of FIG. 17B.
Figure 18B:
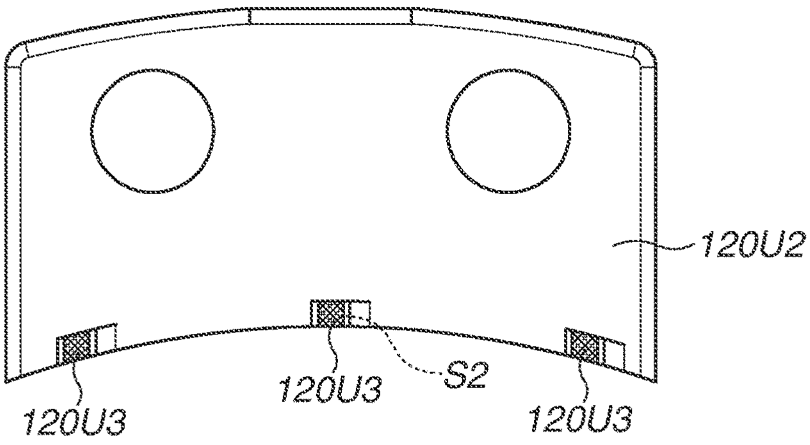
FIG. 18B is a sectional view illustrating a 25B-25B section of FIG. 17B.
Figure 18C:
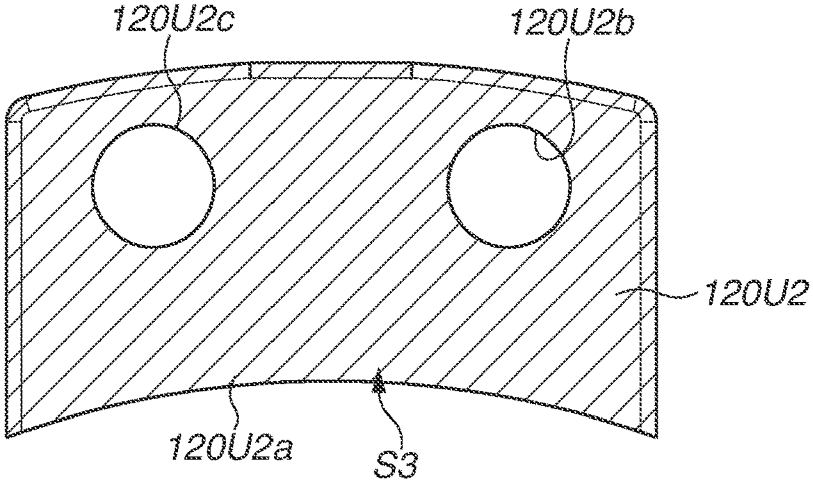
FIG. 18C is a diagram illustrating the area of a flat portion.

FIG. 18A is a sectional view illustrating a 25A-25A section of FIG. 17B. FIG. 18B is a sectional view illustrating a 25B-25B section of FIG. 17B. FIG. 18C is a diagram illustrating the area of the flat portion 120U2*a*.

FIG. 19 is a diagram illustrating a positional relationship between the extending portion 104*b* of the opening member 104 and the fixing tab 120U2. FIG. 19 illustrates the state seen in the height direction (X) of the pouch 101.

Figure 20A:
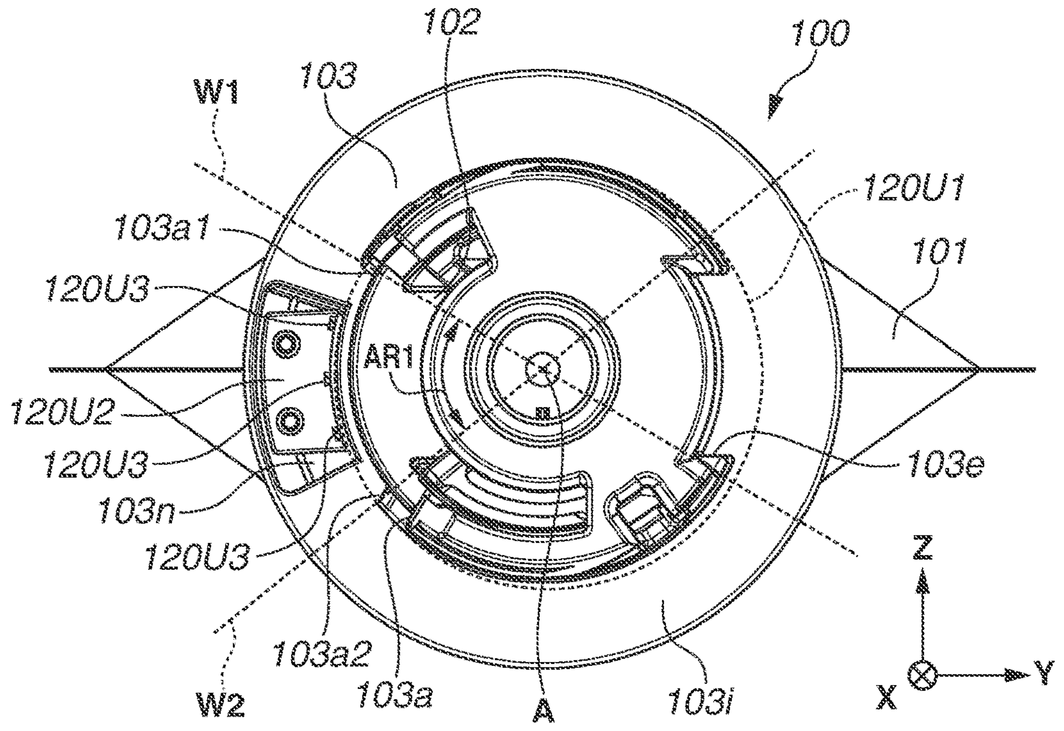
FIG. 20A is a bottom view of the toner pack, illustrating a positional relationship between the fixing tab and the opening of the pack-side shutter.
Figure 20B:
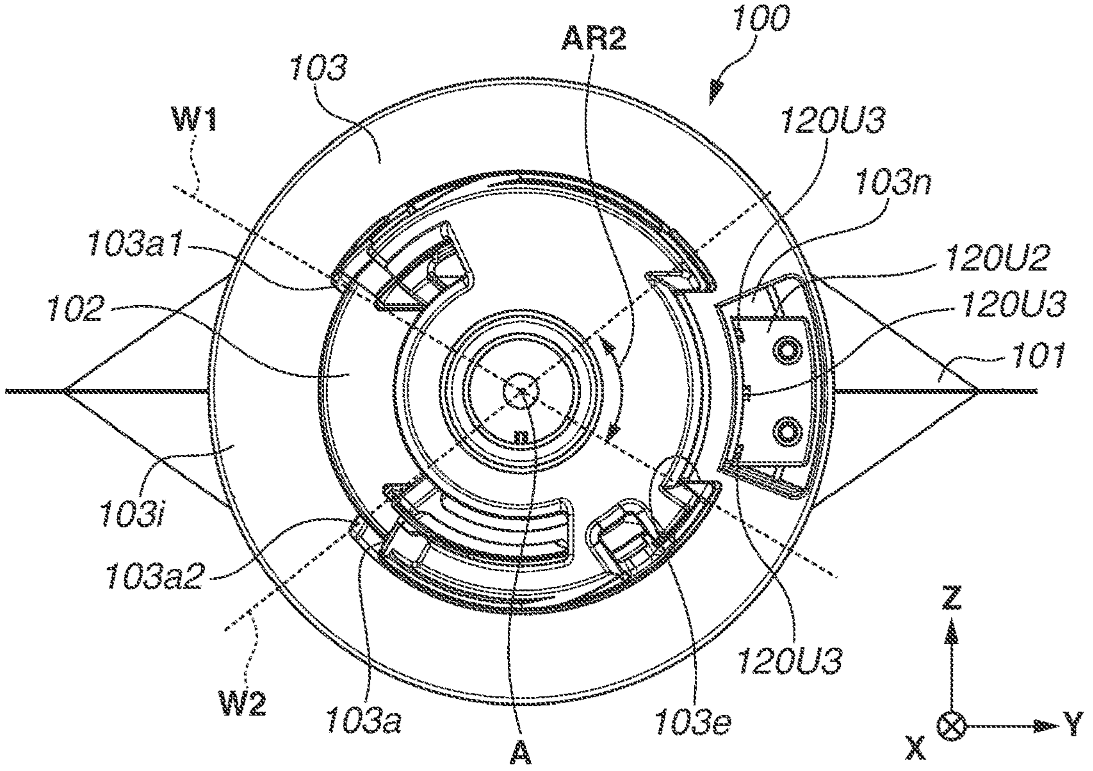
FIG. 20B is a bottom view of a toner pack according to a modification.

FIG. 20A is a bottom view of the toner pack 100, illustrating a positional relationship between the fixing tab 120U2 and the opening 103*a* of the pack-side shutter 103. FIG. 20B is a bottom view of the toner pack 100 according to a modification. FIGS. 20A and 20B also illustrate the states seen in the height direction (X) of the pouch 101.

As illustrated in FIG. 16, the fixing tab 120U2 is located farther from the rotation axis A than the cap outer peripheral surface 120*f* of the cap main body portion 120U1 in the radial direction r. The fixing tab 120U2 is bonded and fixed to the cap fixing portion 103*n* disposed on the flange portion 103*i* of the pack-side shutter 103. Here, the protrusions 103*n*2 and 103*n*3 of the cap fixing portion 103*n* are engaged with the holes 120U2*b* and 120U2*c* of the fixing tab 120U2.

The flat portion 120U2*a* of the fixing tab 120U2 is bonded to the flat portion 103*n*1 of the cap fixing portion 103*n*. The relationship between the holes 120U2*b* and 120U2*c* and the protrusions 103*n*2 and 103*n*3 may be reversed. The numbers, sizes, and shapes of the holes 120U2*b* and 120U2*c* and the protrusions 103*n*2 and 103*n*3 are not limited, either.

The fixing tab 120U2 is suitably fixed with such a strength that the fixing tab 120U2 is not easily peelable from the cap fixing portion 103*n*. Moreover, the fixing tab 120U2 is desirably fixed with a strength higher than the strength of the material of the cap 120.

In other words, in detaching the cap main body 120U1 from the toner pack 100, the cap main body 120U1 and the fixing tab 120U2 are desirably separated before the fixing tab 120U2 and the cap fixing portion 103*n* are unfastened. For that purpose, as illustrated in FIGS. 17A and 17B, the present embodiment includes the connecting portions 120U3 configured to break before the fixing tab 120U2 and the cap fixing portion 103*n* are unfastened. In the present embodiment, three connecting portions 120U3 are disposed. However, this is not restrictive, and one, two, or four or more connecting portions may be disposed.

The three connecting portions 120U3 have substantially the same shapes, and are located at respective different circumferential positions about the rotation axis A. The three connecting portions 120U3 are columnar ribs extending along the rotation axis A and each connecting the cap main body portion 120U1 and the fixing tab 120U2. In terms of a cross section orthogonal to the rotation axis A, each connecting portion 120U3 is configured to have a cross-sectional area smaller than that of the flat portion 120U2*a* of the fixing tab 120U2.

The three connecting portions 120U3 are also configured to have a total cross-sectional area smaller than the cross-sectional area of the fixing tab 120U2. In FIG. 18C, the area S3 of the flat portion 120U2*a* excluding the holes 120U2*b* and 120U2*c* refers to the cross-sectional area of the fixing tab 120U2. The area S3 is greater than a first area S1 and a second area S2 to be described below.

Each connecting portion 120U3 is shaped to be non-uniform and vary intermittently in cross-sectional area between the cap main body portion 120U1 and the fixing tab 120U2 in the axial direction D1 of the rotation axis A. For example, as illustrated in FIGS. 17B, 18A, and 18B, the cross-sectional area of the 25A-25A section of each connecting portion 120U3 that is a first section will be referred to as a first area S1. The cross-sectional area of the 25B-25B section of each connecting portion 120U3 that is a second section will be referred to as a second area S2.

Here, the second area S2 is smaller than the first area S1. The span where the connecting portion 120U3 having the first area S1 is longer than that where the connecting portion 120U3 having the second area S2 is in the axial direction D1 of the rotation axis A.

The 25A-25A section and the 25B-25B section are cross sections orthogonal to the rotation axis A. The 25B-25B section is located at a different position from that of the 25A-25A section in the axial direction D1. More specifically, the 25B-25B section is located closer to the cap main body 120U1 than the 25A-25A section. The connecting portions 120U3 according to the present embodiment thus have a greater cross section near the fixing tab 120U2 and a smaller cross section near the cap main body 120U1.

Each connecting portion 120U3 further includes a corner part T1 and a corner part T2 at the end where the connecting portion 120U3 is connected to the fixing tab 120U2. The corner part T1 is located upstream in the direction of the arrow L, and the corner part T2 downstream. The corner part T1 is smoothly connected to the fixing tab 120U2 with a smaller curvature than the corner part T2. In other words, the corner part T2 is connected to the fixing tab 120U2 with a larger area than the corner part T1.

As described above, since the connecting portions 120U3 have a smaller cross-sectional area near the cap main body portion 120U1, the connecting portions 120U3 are more likely to break near the cap main body portion 120U1. Moreover, since the corner parts T1 are formed with a smaller curvature than the corner parts T2, the corner parts T2 are more likely to bend and less resistant to bending stress than the corner parts T1 when the cap main body 120U1 is rotated in the direction of the arrow Li.

The connecting portions 120U3 therefore break at the parts near the cap main body portion 120U1 before the parts near the fixing tab 120U2 where the connecting portions 120U3 are connected to the fixing tab 120U2, including the corner parts T1 and T2 break. This can reduce the residual of the broken connecting portions 120U3 on the cap main body portion 120U1. Since the user handling the detached cap main body 120U1 is less likely to get caught on the residual, the usability can be improved.

In the present embodiment, the connecting portions 120U3 are configured to have a greater cross-sectional area near the fixing tab 120U2 and a smaller cross-sectional area near the cap main body portion 120U1. However, this is not restrictive. The connecting portions 120U3 can suitably have breakable parts of smaller cross-sectional areas at any position between the cap main body portion 120U1 and the fixing tab 120U2.

In the present embodiment, the cap 120 and the pack-side shutter 103 are made of polypropylene resin. The fixing tab 120U2 and the cap fixing portions 103*n* are bonded by applying a primer consisting mainly of hexane and an amine compound to the respective flat portions 120U2*a* and 103*n*1 and then applying a cyanoacrylate instant glue.

The fixing tab 120U2 and the cap fixing portion 103*n* bonded by such a method have a bonding strength higher than the strength of the connecting portions 120U3. Since the flat portions 120U2*a* and 103*n*1 are thus bonded, the movement of the fixing tab 120U2 with respect to the pack-side shutter 103 in the axial direction D1 of the rotation axis A is restricted.

Moreover, the protrusions **103*n*2 and 103*n*3 are engaged with the holes 120U2*b* and 120U2*c*, whereby the movement of the fixing tab 120U2 with respect to the pack-side shutter 103 in the direction of rotation of the cap main body portion 120U1 is restricted. In other words, the fixing tab 120U2 is fixed to the unit to be mounted 700 including the pack-side shutter 103 so that the movement of the cap main body portion 120U1 with respect to the unit to be mounted 700 is restricted both in the axial direction D1 and in the direction of rotation of the cap main body portion 120U1**.

In detaching the cap main body portion 120U1 of the cap 120 from the toner pack 100, the connecting portions 120U3 therefore break without unsticking the fixing tab 120U2 and the cap fixing portion **103*n*. The cap main body portion 120U1 is thereby separated from the fixing tab 120U2, and the cap main body portion 120U1 can be detached from the toner pack 100**.

The cap 120 with the broken connecting portions 120U3 can be determined to be a used one from the appearance. This can reduce the chances that toner replenishment is attempted using a used toner pack 100. The toner replenishment efficiency can thus be improved.

Next, a positional relationship between the extending portions **104*b* of the opening member 104 and the fixing tab 120U2 will be described with reference to FIG. 19. FIG. 19 is a view of the toner pack 100 and the cap 120 seen in the unmounting direction U (axial direction D1). In FIG. 19, the outer shape of the opening member 104** is illustrated by a broken line.

As illustrated in FIG. 19, the fixing tab 120U2 is located to overlap an extending portion **104*b* of the opening member 104 at least in part when seen in the axial direction D1. The extending portions 104*b* protrude outward from the cap outer peripheral surface 120*f* of the cap main body portion 120U1** in the radial direction r.

When detaching the cap main body portion 120U1 from the toner pack 100, the user applies a force for rotating the cap main body portion 120U1 to the cap main body portion 120U1. Here, the user can easily apply the force to the cap main body portion 120U1 by gripping the extending portions **104*b* of the opening member 104 with the hand other than that rotating the cap main body portion 120U1. In other words, the extending portions 104*b*** function as anti-slip members to prevent the user's hand from slipping in the direction of rotation about the rotation axis A, and can improve operability.

Since the fixing tab 120U2 fixing the cap 120 to the toner pack 100 in the direction of rotation and an extending portion **104*b* are located to overlap when seen in the axial direction D1, the user can easily check the states of the fixing tab 120U2 and the connecting portions 120U3. This facilitates the user determining whether the toner pack 100** is unused or used, and can thus improve usability.

Next, a positional relationship between the fixing tab 120U2 and the opening **103*a* of the pack-side shutter 103 will be described with reference to FIGS. 10A, 19, and 20A. FIGS. 20A and 20B are views of the toner pack 100 seen in the unmounting direction U along the rotation axis A (see FIG. 13**B).

As illustrated in FIGS. 10A and 20A, the fixing tab 120U2 and the cap fixing portion **103*n* are located in the same phase as the opening 103*a* is in the circumferential direction of the imaginary circle VC about the rotation axis A. The cap fixing portion 103*n* may be located at other positions on the flange portion 103*i*, whereas the position according to the present embodiment in the same phase as the opening 103*a* can facilitate the installation of the cap fixing portion 103*n* and the manufacturing of the pack-side shutter 103. Like a modification illustrated in FIG. 20B, the fixing tab 120U2 and the cap fixing portion 103*n* may be located in the same phase as the drive-transmitted portion 103*e*** formed in a recessed shape.

As illustrated in FIGS. 10A and 20A, a straight line passing through one edge **103*al* of the opening 103*a* in the circumferential direction of the imaginary circle VC about the rotation axis A and the rotation axis A when seen in the direction of the rotation axis A (axial direction D1) will be referred to as a first straight line W1. A straight line passing through the other edge 103*a*2 of the opening 103*a* and the rotation axis A will be referred to as a second straight line W2. When seen in the direction of the rotation axis A (axial direction D1), the fixing tab 120U2 and the cap fixing portion 103*n* are located in an area AR1 including the opening 103*a* between the first straight line W1 and the second straight line W2**.

The edges **103*al* and 103*a*2 through which the first and second straight lines W1 and W2 pass, respectively, are the junctions with the flange portion 103*i*, and located at the upstream ends of the side surface 103*d* of the pack-side shutter 103 in the mounting direction M. In the modification illustrated in FIG. 20B, the fixing tab 120U2 and the cap fixing portion 103*n* are located in an area AR2 between the first and second straight lines W1 and W2, opposite the area AR1 including the opening 103*a*** when seen in the direction of the rotation axis A.

As described above, according to the present embodiment, a mode of developer container 800 mountable on the image forming apparatus 1 can be provided. In detaching the cap 120 from the toner pack 100, the cap main body portion 120U1 is separated from the fixing tab 120U2. This facilitates determining whether the toner pack 100 is unused or used, and can improve usability.

The attachment of the cap 120 to the unit to be mounted 700 of the toner pack 100 can protect the unit to be mounted 700. In particular, the cap 120 can protect the drive-transmitted portion **103*e*, the protrusion 102*b*, and the portions to be positioned 102*d* of the unit to be mounted 700**.

The drive-transmitted portion **103*e*, the protrusion 102*b*, and the portions to be positioned 102*d* are used to position the toner pack 100 (nozzle 102) to the mounting unit 106 and to operate the pack-side shutter 103 to rotate using the operation lever 108. The drive-transmitted portion 103*e*, the protrusion 102*b*, and the portions to be positioned 102*d* can thus be prevented from being broken by external impact before toner replenishment, so that the developing container 32 can be appropriately replenished with the toner from the toner pack 100**.

(3) Markings

Next, a layout relationship between the "markings" formed on the outer peripheral surface **120*f* of the cap 120 and parting lines, which is one of the features of the present embodiment, will be described with reference to FIGS. 21A to 26**.

Figures 21A, 21B, 21C, 21D, 21E:
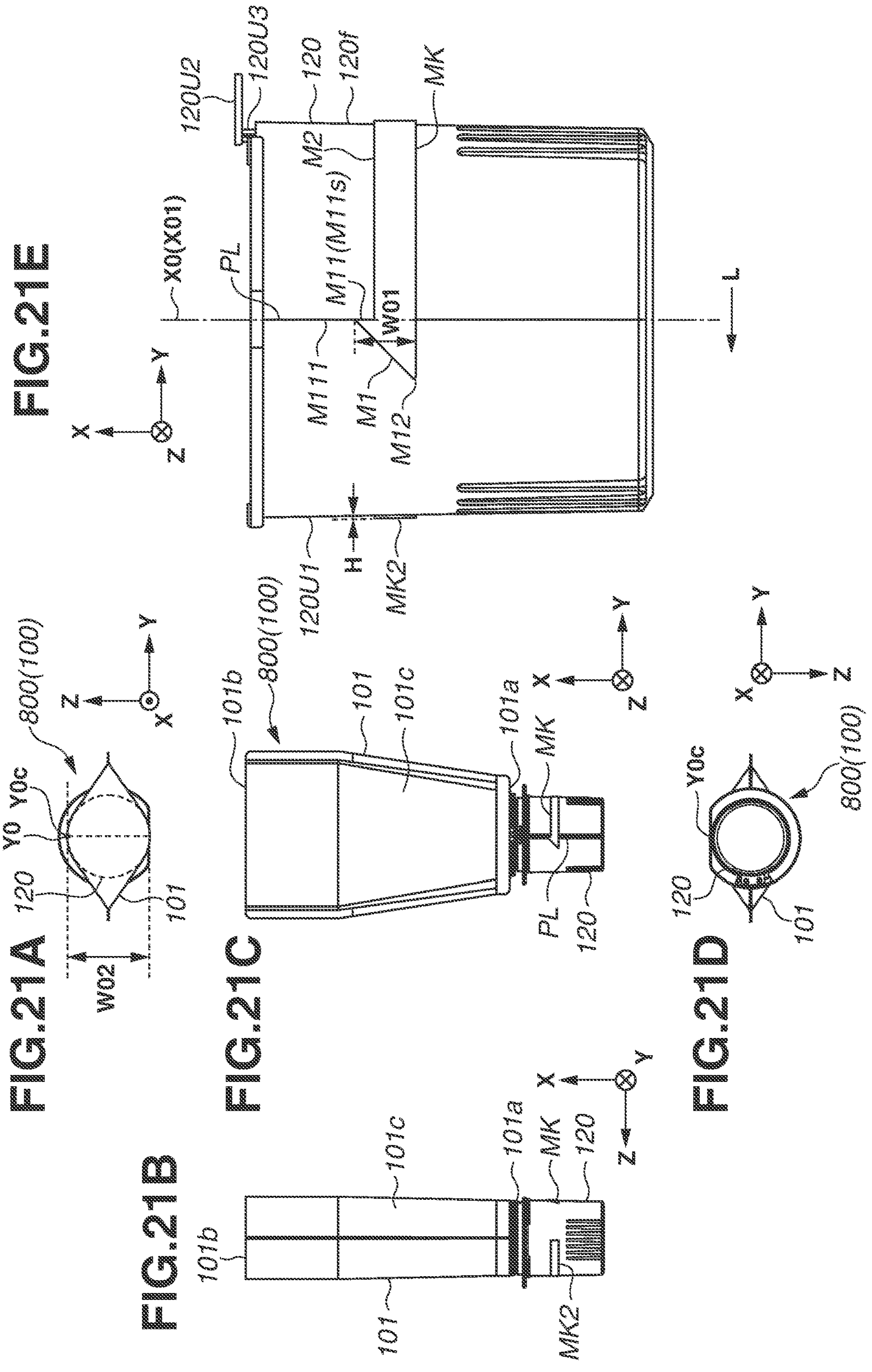
FIG. 21A is a conceptual plan view of the toner pack seen from the bottom side of the pouch along a height direction.
FIG. 21B is a conceptual plan view of the toner pack seen along a width direction.
FIG. 21C is a conceptual plan view of the toner pack seen along a thickness direction.
FIG. 21D is a conceptual plan view of the toner pack seen from the cap side along the height direction.
FIG. 21E is a partly enlarged conceptual diagram illustrating the cap illustrated in FIG. 21C.

FIG. 21A is a conceptual plan view of the toner pack 100 seen from the bottom side of the pouch 101 along the height direction.

FIG. 21B is a conceptual plan view of the toner pack 100 seen along the width direction.

FIG. 21C is a conceptual plan view of the toner pack 100 seen along the thickness direction.

FIG. 21D is a conceptual plan view of the toner pack 100 seen from the cap (120) side along the height direction.

FIG. 21E is a partly enlarged conceptual diagram illustrating the cap 120 illustrated in FIG. 21C. FIG. 21E illustrates a positional relationship between the markings on the outer peripheral surface 120*f* of the cap 120 and the parting lines.

As illustrated in FIGS. 21A to 21D, 8A, and 8B, in the present embodiment, the developer container 800 includes the toner pack 100 and the cap 120. The toner pack 100 includes the pouch 101 that can accommodate toner, and the communication member 900.

The pouch 101 includes a bottom portion 101*b* and a side portion 101*c* extending from the bottom portion 101*b* to form the opening 101*a*.

The communication member 900 is fixed to the opening side of the pouch 101, and makes the inside of the pouch 101 communicate with the outside.

The cap 120 is formed by injection molding, and can be detached from the communication member 900 by rotation with respect to the communication member 900.

As illustrated in FIG. 21E, in the present embodiment, a marking MK indicating the direction of rotation (direction of the arrow L) for detaching the cap 120 from the communication member 900 and a parting line PL are formed on the outer peripheral surface 120*f* of the cap 120.

In the present embodiment, the marking MK is formed to protrude from the outer peripheral surface 120*f* of the cap 120. Specifically, the marking MK protrudes from the outer peripheral surface 120*f* outward in the radial direction r (see FIG. 16). In the present embodiment, the height (H) of the marking MK from the outer peripheral surface 120*f* is 1.0 mm or less.

The marking MK includes an arrowhead part M1 indicating the direction and a shaft part M2.

As described above, in the present embodiment, the cap 120 includes the cap main body 120U1 and the coupling unit Cx1. The coupling unit Cx1 is disposed on the edge portion CP01 (see FIG. 14A) of the cap main body 120U1 and couples the cap main body 120U1 to the communication member 900 (see FIG. 8B).

As described above, in the present embodiment, the connecting portions 120U3 of the coupling unit Cx1 are configured to be able to be sheared by a relative movement of the cap main body 120U1 and the communication member 900 in the direction of rotation (L).

As described above, in the present embodiment, the coupling unit Cx1 is integrally formed with the cap main body 120U1.

As described above, the coupling unit Cx1 is formed on the outer peripheral surface 120*f* of the cap 120 at a position 900 upstream or 90° downstream of the position where the parting line PL is formed, in the direction of rotation L with a rotation axis X0 (rotation axis A) as a center of rotation C1.

As described above, the coupling unit Cx1 includes the connecting portion 120U2 connected and fixed to the communication member 900, and the plurality of links 120U3.

As described above, the links (connecting portions) 120U3 are each coupled to the cap main body 120U1 at one end, and to the connecting portion 120U2 at the other end.

As described above, adjoining two links 120U3 are located at a predetermined distance or more from each other in a direction YPL (see FIG. 24) in which parting lines PL extending in a direction X01 along the rotation axis X0 of the cap 120 are arranged. In other words, adjoining two links 120U3 are located at respective different positions in the circumferential direction about the rotation axis A, and have a gap therebetween.

The arrowhead part M1 includes a rear end M11 located upstream in the direction of rotation (L) and a front end M12 located downstream. The shaft part M2 is formed to be continuous with the rear end M11 of the arrowhead part M1 at the upstream side of the arrowhead part M1 in the direction of rotation (L), and extends along the direction of rotation (L).

The parting lines PL extend over the outer peripheral surface 120*f* of the cap 120 in the direction X01 along the rotation axis X0 of the cap 120. Aside from the outer peripheral surface 120*f*, the parting lines PL can be formed on the bottom surface 120*b* (outer bottom surface) of the cap 120 depending on the molds to be used.

In the present embodiment, a second marking MK2 is also formed on the outer peripheral surface 120*f* of the cap 120 aside from the marking MK.

Figure 24:
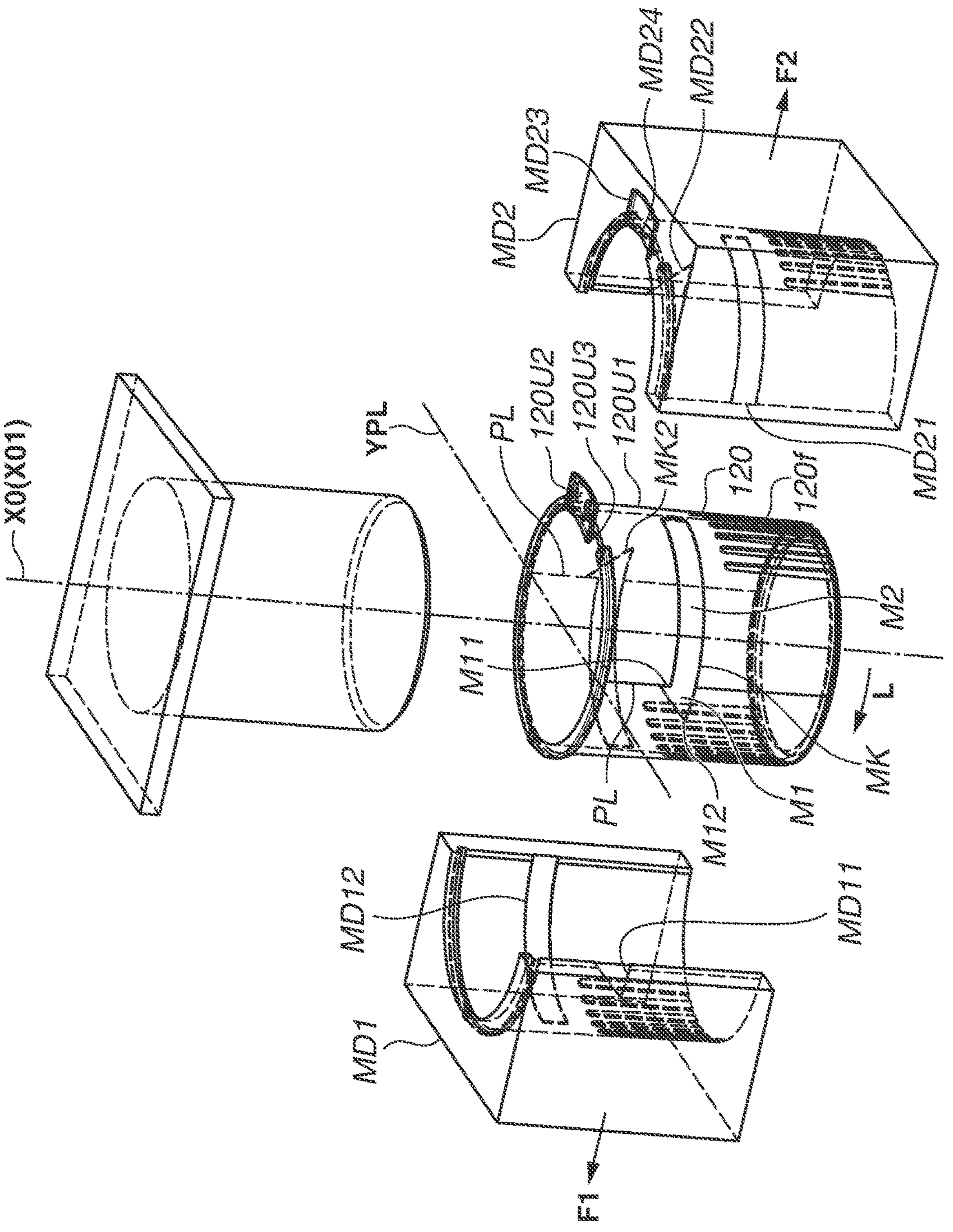
FIG. 24 is a partly transparent conceptual perspective view of the molds for forming the cap, seen from above.
Figure 25:
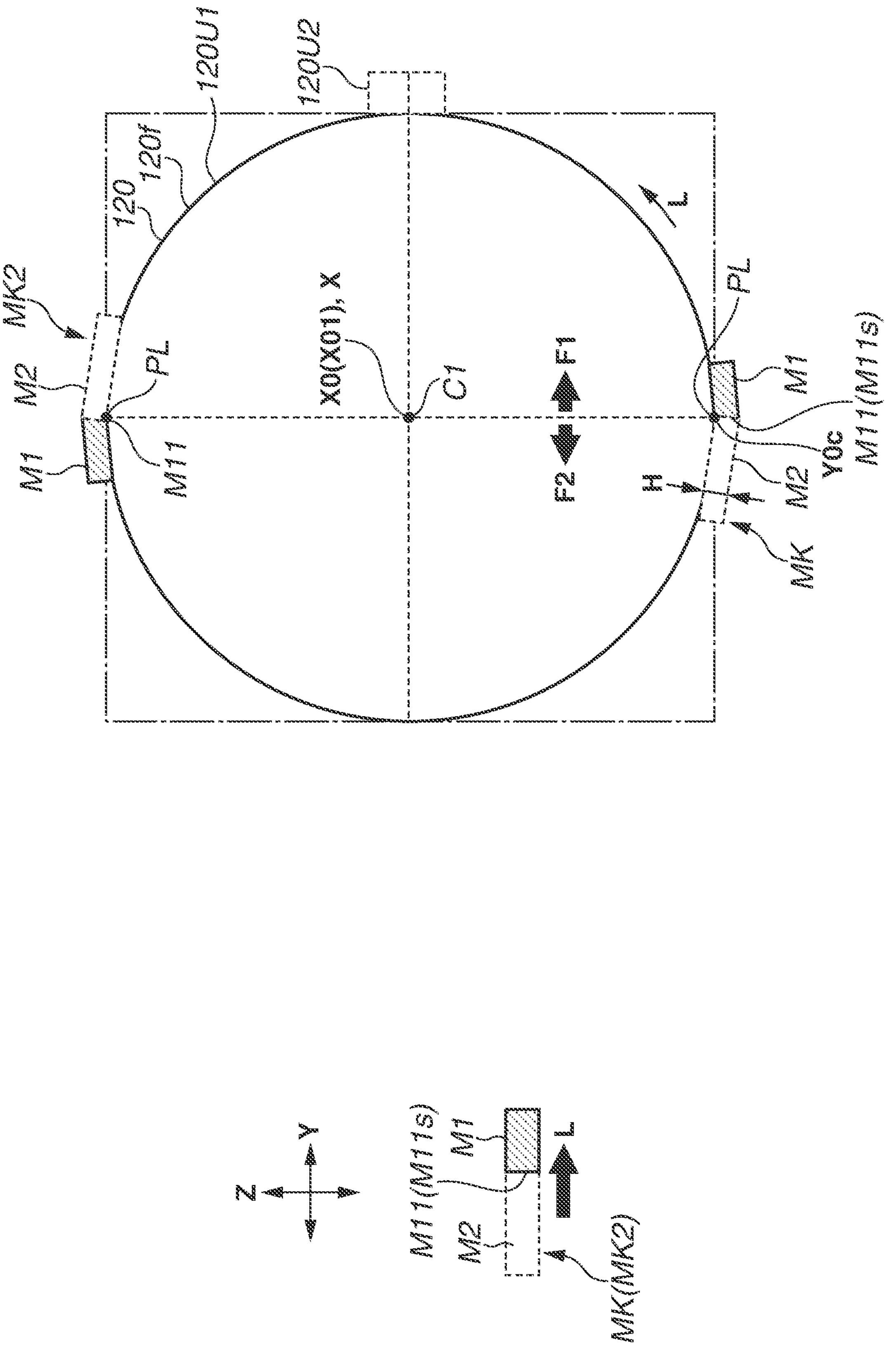
FIG. 25 is a conceptual diagram illustrating positions of markings and parting lines on an outer peripheral surface of a cap according to a first embodiment.

As illustrated in FIGS. 24 and 25, the second marking MK2 is formed on the outer peripheral surface 120*f* of the cap 120 at a position 1800 moved from the position of the marking MK in the direction of the arrow L. In other words, if the second marking MK2 is 1800 rotated with the rotation axis X0 as the center of rotation C1, the second marking MK2 falls on the original position of the marking MK.

That is, the second marking MK2 is rotationally symmetrical with the marking MK with the rotation axis X0 of the cap 120 as the center of rotation C1. While in the present embodiment the two markings MK and MK2 are disposed on the outer peripheral surface 120*f* of the cap 120, the number of markings may be one (only the marking MK).

As illustrated in FIG. 21E, the arrowhead part M1 includes a maximum head part M111 where a head width WO1 in a direction orthogonal to the direction of the arrow L is maximized. In the present embodiment, the maximum head part M111 is located at a rear end face M11*s* of the arrowhead part M1.

The arrowhead part M1 desirably has a triangular shape. However, the arrowhead part M1 may have any shape that can indicate directionality, and is not necessarily limited to a triangle in particular. For example, the front end M12 of the arrowhead part M1 may include a round part. The arrowhead part M1 may have a deformed shape combining a triangle and other shapes.

(4) Molds for Molding Cap

Next, molds used for the injection molding of the cap 120 will be described.

Figure 22:
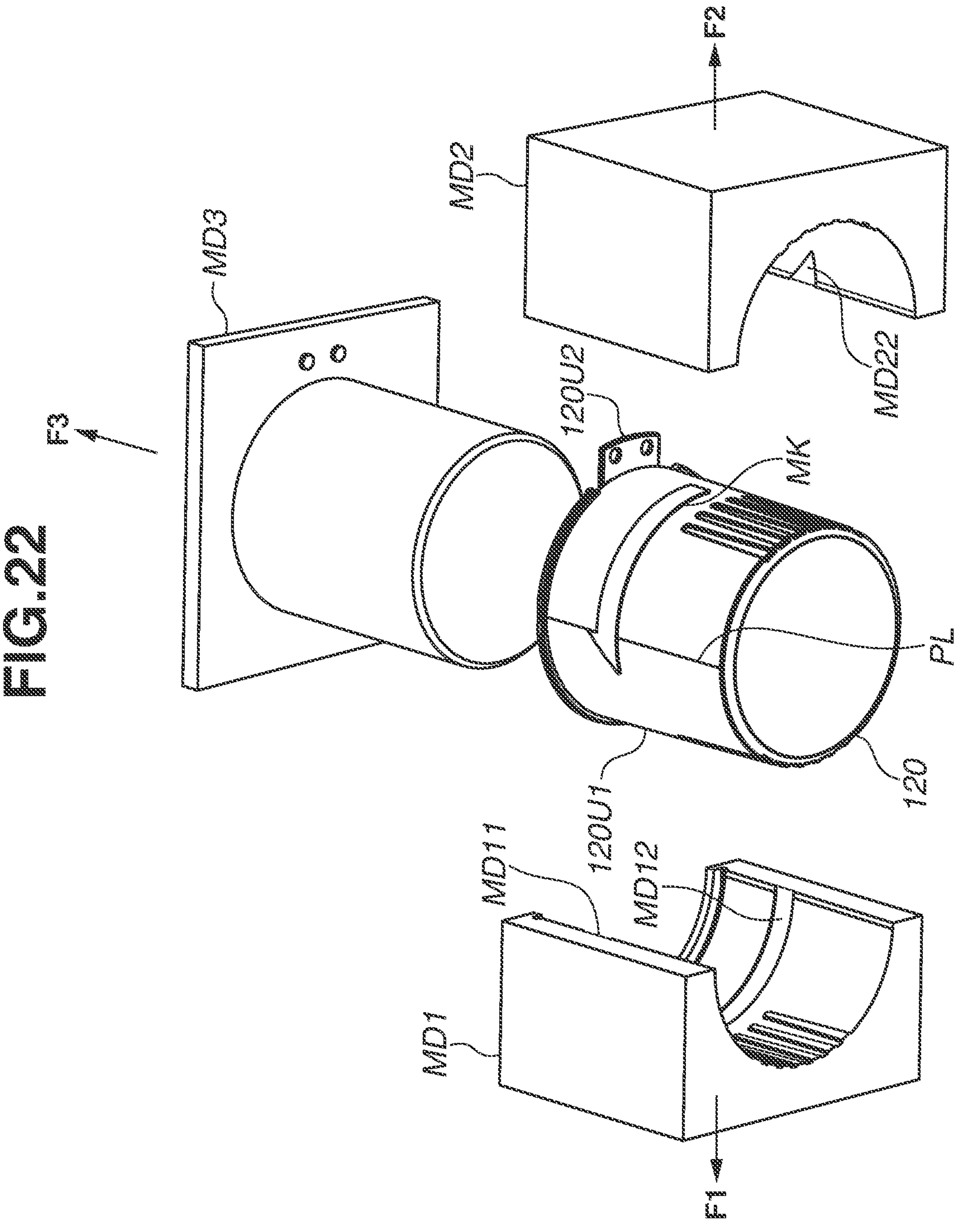
FIG. 22 is a conceptual perspective view of molds for forming the cap, seen from below.

FIG. 22 is a conceptual perspective view of the molds for forming the cap 120 seen from below.

Figure 23:
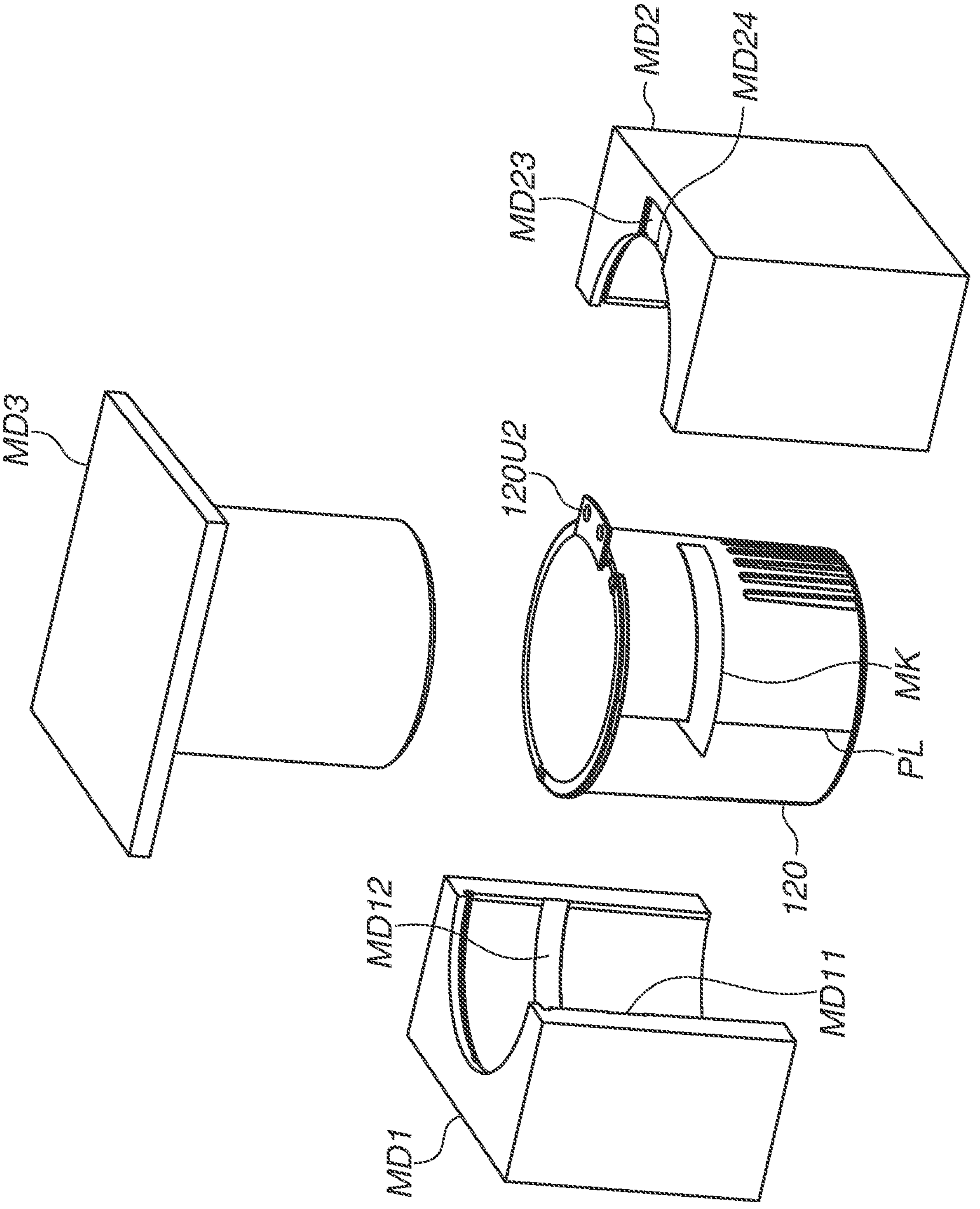
FIG. 23 is a conceptual perspective view of the molds for forming the cap, seen from above.

FIG. 23 is a conceptual perspective view of the molds for forming the cap 120 seen from above.

FIG. 24 is a partly transparent conceptual perspective view of the molds for forming the cap 120 seen from above.

As illustrated in FIGS. 22 to 24, three molds MD1, MD2, and MD3 are mainly used to injection-mold the cap 120 according to the present embodiment.

Specifically, a mold for forming the cap 120 is formed by locating a third mold MD3 between a first mold MD1 and a second mold MD2. The first and second molds MD1 and MD2 are movable in respective opposite directions F1 and F2. The third mold MD3 is movable in a direction F3 orthogonal to the direction F1 (F2). The first and second molds MD1 and MD2 correspond mainly to the outer shape of the cap 120. The third mold MD3 corresponds to the inner shape of the cap 120.

In the present embodiment, there is also a counter mold opposed to the third mold MD3 in the direction F3. The counter mold is omitted here. The counter mold may be integrated with the shapes of the molds MD1 and MD2 and configured as a part of the molds MD1 and MD2. In other words, the mold for the cap 120 may be formed of the molds MD1 to MD3.

The cap 120 is formed by injecting a resin into the mold formed by the molds MD1 to MD3 and the counter mold.

After the cap 120 is molded, the cap 120 can be released from the first and second molds MD1 and MD2 by moving the first and second molds MD1 and MD2 along the directions F1 and F2, respectively.

Similarly, the cap 120 can be released from the third mold MD3 by moving the third mold MD3 and the counter mold (not illustrated) along the direction F3.

The parting lines PL are formed on the outer peripheral surface 120*f* of the cap 120 along the parting surfaces of the first and second molds MD1 and MD2. In the present embodiment, the mold MD3 is split in a slide configuration (not illustrated) so that the mold MD3 can be pulled out in the direction F3 even if the cap 120 has the foregoing “screw protrusions 120*e*” on its inner peripheral surface.

The first mold MD1 mainly includes a first forming portion MD11 corresponding to the arrowhead part M1 of the marking MK and a second forming portion MD12 corresponding to the shaft part of the second marking MK2.

The second mold MD2 mainly includes a third forming portion MD21 (see FIG. 24) corresponding to the shaft part M2 of marking MK and a fourth forming portion MD22 (see FIG. 22) corresponding to the arrowhead part of the second marking MK2.

As illustrated in FIG. 23, the second mold MD2 includes a fifth forming portion MD23 and a sixth forming portion MD24 corresponding to the fixing tab 120U2 and the connecting portions 120U3. The sixth forming portion MD24 is a configuration for forming a gap G01 between adjoining two adjoining connecting portions 120U3 (see FIG. 17B).

More specifically, the sixth forming portion MD24 can form the plurality of connecting portions 120U3 (see FIG. 17B) arranged in the direction YPL (see FIG. 24) in which the parting lines PL are arranged. The sixth forming portion MD24 can be pulled out of the gaps G01 by moving the second mold MD2 in the direction F2.

(5) Positional Relationship Between Marking MK and Parting Lines PL

Next, a relationship between the arrowhead part M1 of the marking MK and the parting lines PL on the outer peripheral surface 120*f* of the cap 120 according to the first embodiment will be described with reference to FIGS. 8A, 8B, 21A to 21E, 25, and 26.

FIG. 25 is a conceptual diagram illustrating the positions of the markings MK and MK2 and the parting lines PL on the cap outer peripheral surface 120*f* according to the first embodiment. FIG. 25 and FIGS. 26 to 29 to be described below conceptually illustrate the state of the cap 120 seen from the bottom 120*b* side of the cap 120 along the rotation axis X0 of the cap 120.

Figure 26:
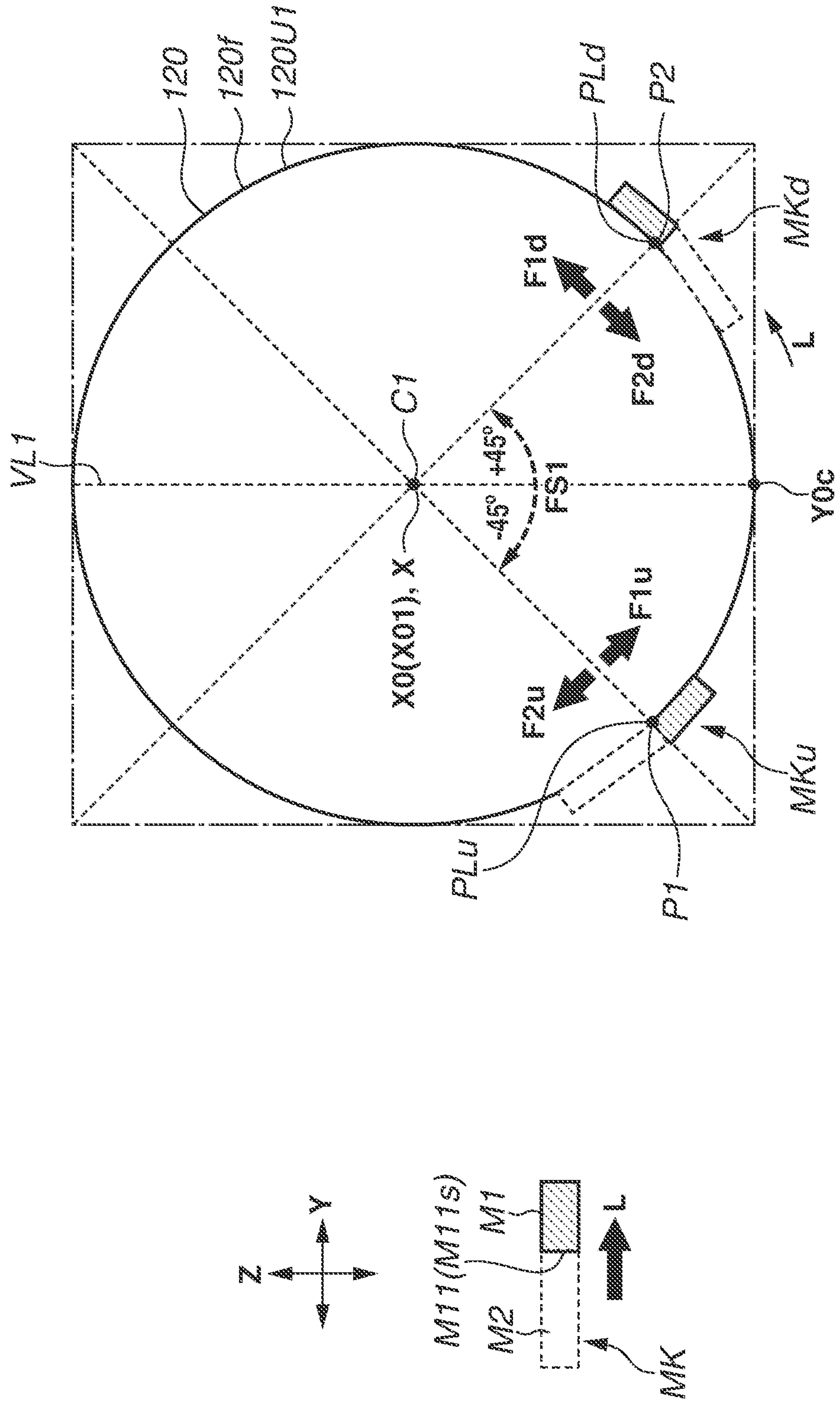
FIG. 26 is a conceptual diagram illustrating a possible layout area of a marking and a parting line on the outer peripheral surface of the cap according to the first embodiment.

FIG. 26 is a conceptual diagram illustrating a possible layout area FS1 of the marking MK and a parting line PL on the cap outer peripheral surface 120*f* according to the first embodiment. In FIG. 26, components such as the fixing tab 120U2 and the second marking MK2 are omitted.

As illustrated in FIGS. 8A, 8B, and 21A to 21E, in the present embodiment, a direction connecting the opening side (101*a*) and the bottom side (101*b*) of the pouch 101 can be defined as a first direction X. The longitudinal direction of the cross-sectional shape of the pouch 101 orthogonal to the first direction X can be defined as a second direction Y. A direction orthogonal to the first direction X and the second direction Y can be defined as a third direction Z.

As illustrated in FIG. 21A, when seen along the first direction X, there is a position Y0 in the second direction Y where a thickness W02 of the pouch 101 in the third direction Z is maximized in the state where the cap 120 is not yet to be detached from the communication member 900. The position on the outer peripheral surface 120*f* of the cap 120 corresponding to the position Y0 where the thickness W02 of the pouch 101 is maximized can be defined as a reference position Y0*c*.

FIG. 26 illustrates a first position P1 and a second position P2 that are defined along the outer peripheral surface 120*f* with the rotation axis X0 as the center of rotation C1 as follows: The first position P1 is a position 450 moved upstream from the reference position Y0*c* in the direction of rotation (L). The second position P2 is a position 450 moved downstream from the reference position Y0*c* in the direction of rotation (L).

In the first embodiment, at least the end face M11*s* of the rear end M11 of the arrowhead part M1 is located in the possible layout area FS1 between the first and second positions P1 and P2 of the outer peripheral surface 120*f*. A parting line PL is located to overlap the end face M11*s*.

For example, if the end face M11*s* of the rear end M11 of the arrowhead part M1 is located at the upstream first position P1, a parting line PLu can also be located at the first position P1. Here, the first mold MD1 can be moved along a direction F1*u*, and the second mold MD2 a direction F2*u*.

On the other hand, if the end face M11*s* of the rear end M11 of the arrowhead part M1 is located at the downstream second position P2, a parting line PLd can also be located at the second position P2. Here, the first mold MD1 can be moved along a direction F1*d*, and the second mold MD2 along a direction F2*d*.

The foregoing configuration of the cap 120 can facilitate the formation of the marking MK having the arrowhead part M1 using simple molds. Moreover, the marking MK formed on the outer peripheral surface 120*f* of the cap 120 is likely to come into the user’s field of view (range corresponding to the possible layout area FS1), which improves the operability in detaching the cap 120. In other words, the user’s operability in detaching the cap 120 from the toner pack 100 can be improved while reducing the complication of the molds used to manufacture the cap 120.

More specifically, when detaching the cap 120 from the pouch 101 by manual operation (rotation), the user can easily grip the pouch 101 with fingers from both sides in the thickness (Z) direction in which the pouch 101 is smallest and easiest to grip among the height (X), thickness (Z), and width (Y), three directions.

When the user sees the outer peripheral surface 120*f* of the cap 120 in the thickness (Z) direction while gripping the pouch 101 in hand, the direction (orientation) of the arrow (marking MK) formed on the outer peripheral surface 120*f* of the cap 120 can thus naturally come into the user’s field of view (i.e., the possible layout area FS1 comes to the front).

This significantly improves the operability in detaching the cap 120 from the pouch 101, and enables the manufacturing of the cap 120 by injection mold using simple molds.

In particular, as illustrated in FIG. 25, according to the present embodiment, the rear end face M11*s* of the arrowhead part M1 of the marking MK and the parting line PL can be located to fall on the reference position Y0c.

As a result, the marking MK is likely to come near the front center position of the cap 120 with respect to the user gripping the pouch 101. This further improves the ability to recognize the marking MK.

Moreover, the foregoing maximum head part M111 (rear end face M11s) and the parting line PL can be located at the same position. The shape corresponding to the maximum head part M111 can thus be formed in either one of the pair of opposed molds MD1 and M2, e.g., the mold MD1. In separating the mold MD1 from the cap 120 along the direction F1, an issue of "undercuts" is therefore less likely to occur since the mold MD1 has no part (obstructing part) where the head width W01 (see FIG. 21E) is smaller upstream of the maximum head part M111 in the direction F1.

Next, a second embodiment of the present disclosure will be described with reference to FIGS. 27 to 29. Differences from the first embodiment will mainly be described below.

Figure 27:
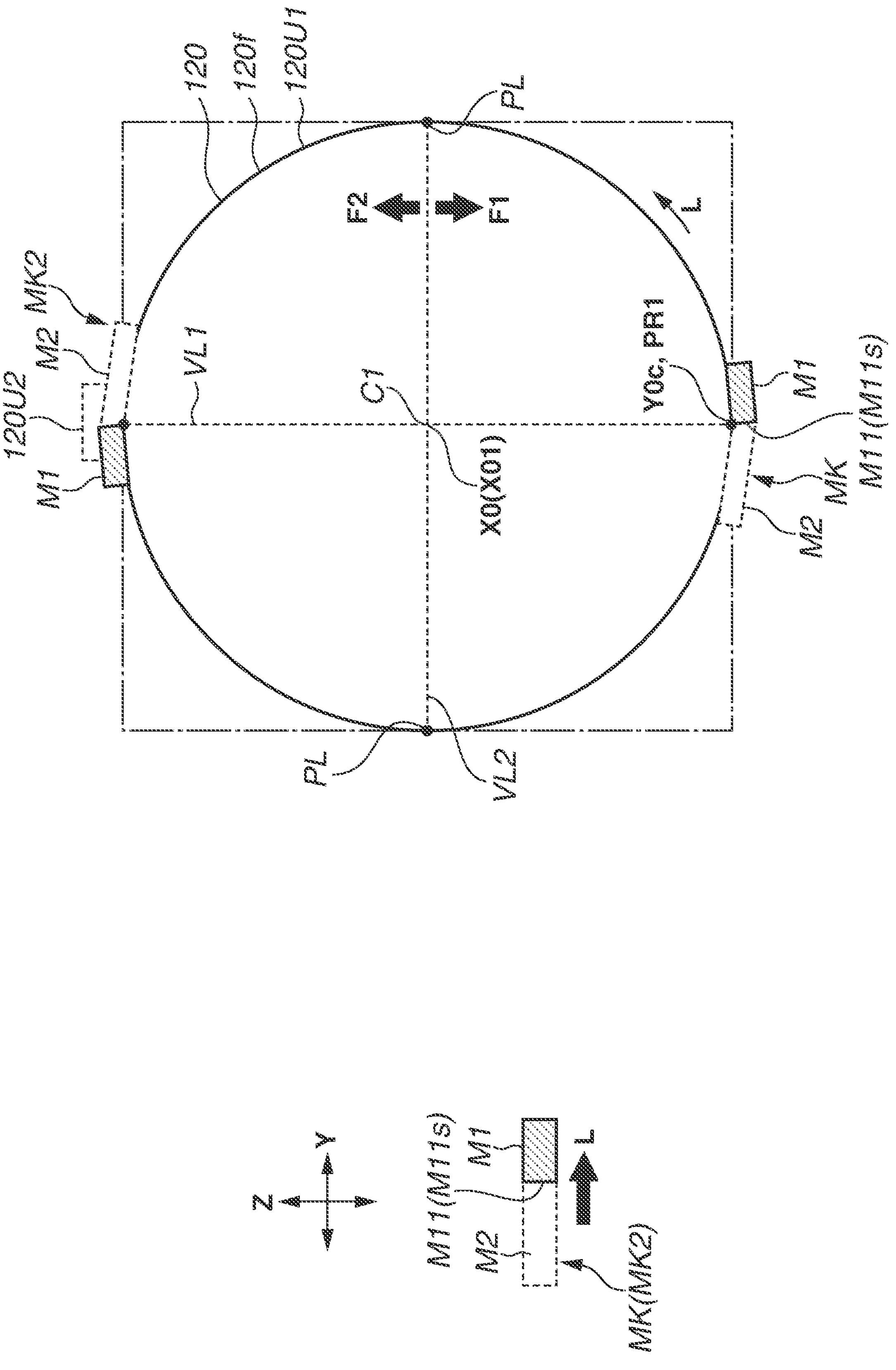
FIG. 27 is a conceptual diagram illustrating positions of markings and parting lines on the outer peripheral surface of a cap of a toner pack used for an image forming apparatus constituting an image forming system according to a second embodiment of the present disclosure.

FIG. 27 is a conceptual diagram illustrating the positions of markings MK and MK2 and parting lines PL on a cap outer peripheral surface 120f of a toner pack used in an image forming apparatus constituting an image forming system according to the second embodiment of the present disclosure.

Figure 28:
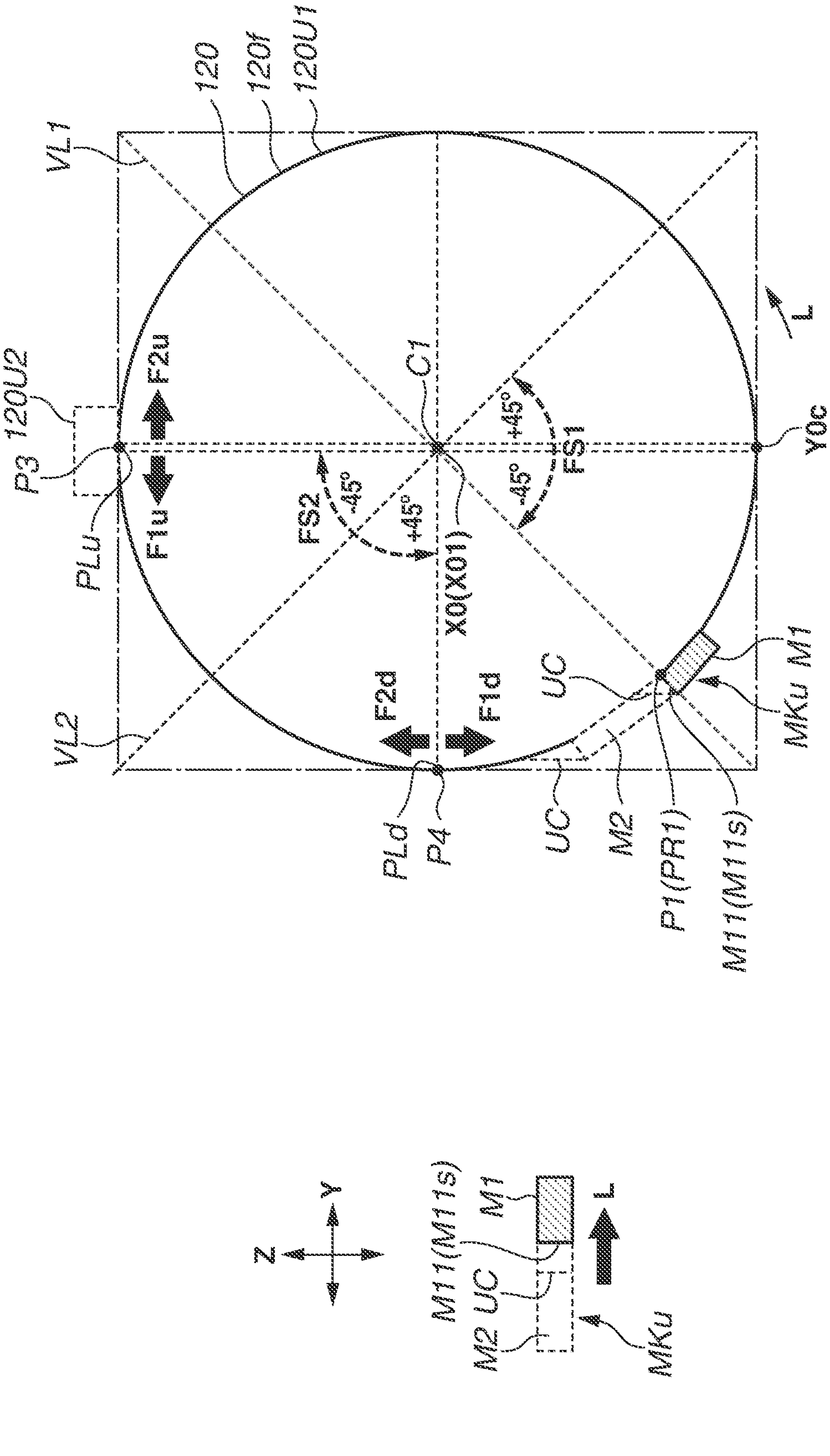
FIG. 28 is a conceptual diagram illustrating a possible layout area of a marking on the outer peripheral surface of the cap and a possible layout area of a parting line when the marking is located at one end of the area according to the second embodiment.

FIG. 28 is a conceptual diagram illustrating a possible layout area FS1 of the marking MK on the cap outer peripheral surface 120f and a possible layout area FS2 of a parting line PL when the marking MK is located at one end of the possible layout area FS1 according to the second embodiment. In FIG. 28, components such as a fixing tab 120U2 and a second marking MK2 are omitted.

Figure 29:
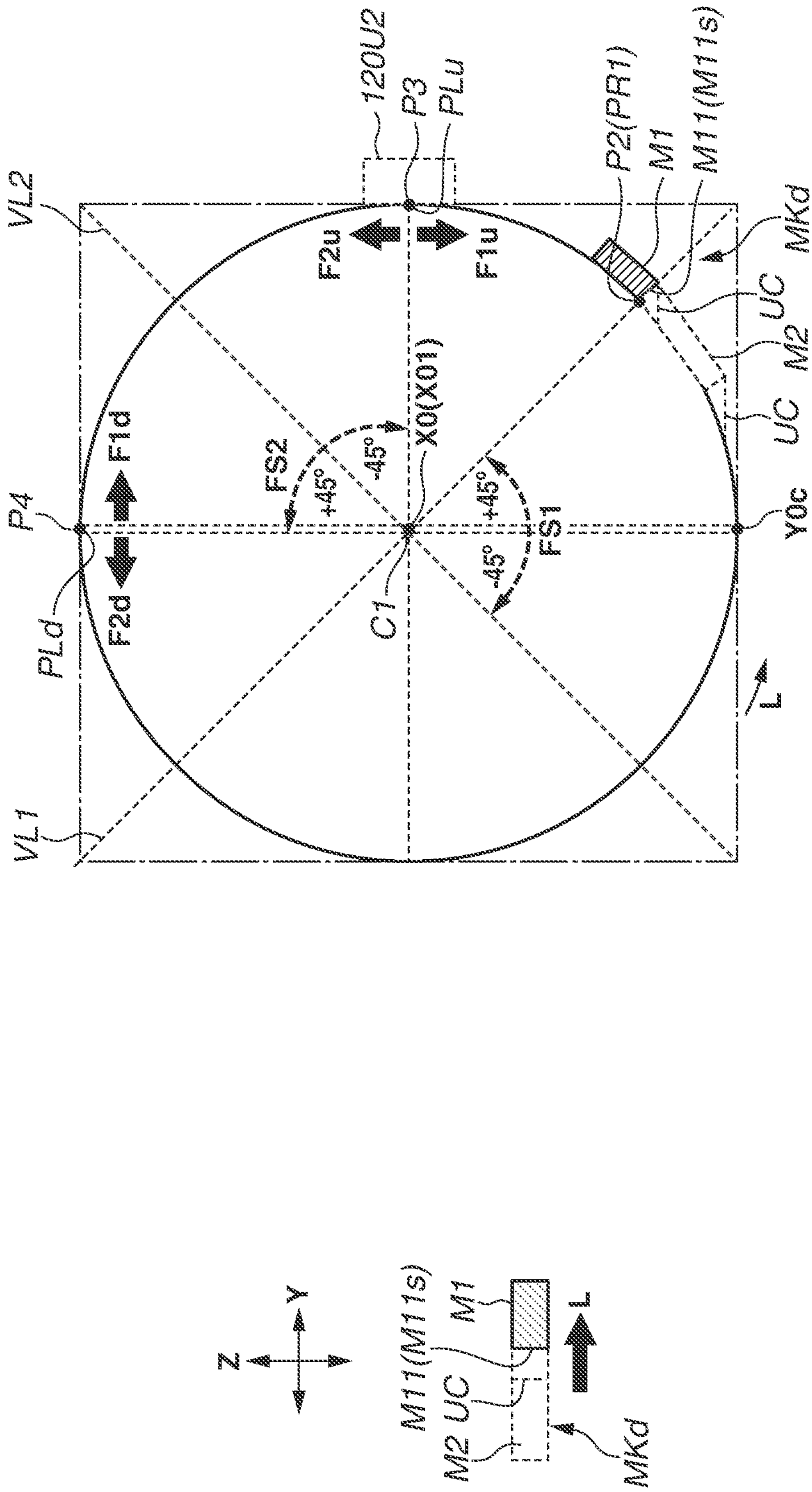
FIG. 29 is a conceptual diagram illustrating the possible layout area of the marking on the outer peripheral surface of the cap and the possible layout area of the parting line when the marking is located at the other end of the area according to the second embodiment.

FIG. 29 is a conceptual diagram illustrating the possible layout area FS1 of the marking MK on the cap outer peripheral surface 120f and the possible layout area FS2 of the parting line PL when the marking MK is located at the other end of the possible layout area FS1 according to the second embodiment. In FIG. 29, components such as the fixing tab 120U2 and the second marking MK2 are omitted.

In the foregoing first embodiment, the cap 120 is described to be configured so that the parting line PL and the rear end face M11s of the arrowhead part M1 are located at the same position. The cap 120 is also described to be configured so that the arrowhead part M1 comes to the front (the range corresponding to the possible layout area FS1) when the user grips the toner pack 100 in the thickness direction Z.

The second embodiment describes a configuration where the arrowhead part M1 comes to the front when the user grips the toner pack in the thickness direction Z, but the parting line PL and the rear end face M11s of the arrowhead part M1 are located at different positions.

In the second embodiment, the marking MK is formed to protrude from the outer peripheral surface 120f of the cap 120. In the present embodiment, the marking MK has a height (H) of 1.0 mm or less from the outer peripheral surface 120f. As a modification of the second embodiment, the marking MK may be formed to be recessed (inward in a radial direction r) from the outer peripheral surface 120f instead of being protruded.

Next, a positional relationship between the marking MK and the parting line PL according to the second embodiment will be described.

Like the first embodiment, in the second embodiment, as illustrated in FIGS. 8A, 8B, and 21A to 21E, the direction connecting the opening side (101a) and the bottom side (101b) of a pouch 101 can be defined as a first direction X. A longitudinal direction of the sectional shape of the pouch 101 orthogonal to the first direction X can be defined as a second direction Y. A direction orthogonal to the first and second directions X and Y can be defined as a third direction Z.

Again, in the second embodiment, as illustrated in FIG. 21A, when seen along the first direction X, there is a position Y0 in the second direction Y where a thickness W02 of the pouch 101 in the third direction Z is maximized in the state where the cap 120 is not yet to be detached from a communication member 900. The position on the outer peripheral surface 120f of the cap 120 corresponding to the position Y0 where the thickness W02 of the pouch 101 is maximized can be defined as a reference position Y0c.

In the second embodiment, as illustrated in FIGS. 28 and 29, a first position P1 and a second position P2 are defined along the outer peripheral surface 120f with the rotation axis X0 as the center of rotation C1 as follows: The first position P1 is a position 450 moved upstream from the reference position Y0c in the direction of rotation (L). The second position P2 is a position 450 moved downstream from the reference position Y0c in the direction of rotation (L).

Here, at least a part of the arrowhead part M1 (for example, the end face M11s of the rear end M11) is located in the possible layout area FS1 between the first position P1 and the second position P2 on the outer peripheral surface 120f.

Now, a straight line connecting an end face position PR1 of the end face M11s at the rear end M11 of the arrowhead part M1 and the center of rotation C1 can be referred to as a first imaginary line VL1. A straight line orthogonal to the first imaginary line VL1 can be referred to as a second imaginary line VL2. A position 450 upstream of the second imaginary line VL2 can be referred to as a third position P3, and a position 450 downstream of the second imaginary line VL2 a fourth position P4.

In the second embodiment, the parting line PL is located in the possible layout area FS2 of the outer peripheral surface 120f between the third position P3 and the fourth position P4.

Specifically, suppose, as illustrated in FIG. 28, that the end face M11s of the rear end M11 of the arrowhead part M1 is located at the upstream end position (first position P1) of the possible layout area FS1. In such a case, the parting line PL can be located in the possible layout area FS2 between the third position P3 that is 45° upstream and the fourth position P4 that is 45° downstream of the second imaginary line VL2 orthogonal to the first imaginary line VL1 connecting the end face position PR1 and the center of rotation C1.

For example, if the parting line PL is located at the third position P3, a mold MD1 can be released along a direction F1u, and a mold MD2 along a direction F2u.

On the other hand, if the parting line PL is located at the fourth position P4, the mold MD1 can be released along a direction F1d, and the mold MD2 along a direction F2d.

As can be seen from FIG. 28, the portions of the marking MK that can be undercuts are minimized if the parting line PL is located to overlap the second imaginary line VL2. If the parting line PL (PLu or PLd) is located at the third position P3 or the fourth position P4, the marking MK has undercuts with no significant effect on the visibility of the marking MK. Suppose, for example, that the parting line PLd is located at the fourth position P4 as illustrated in FIG.

28. This produces undercuts UC but provides sufficient visibility since the outline (edges) of the marking MK is less chamfered.

Conversely, suppose that as illustrated in FIG. 29, the end face M11*s* of the rear end M11 of the arrowhead part M1 is located at the downstream end position (second position P2) of the possible layout area FS1. In such a case, the parting line PL can be located in the possible layout area FS2 between the third position P3 that is 45° upstream and the fourth position P4 that is 45° downstream of the second imaginary line VL2 orthogonal to the first imaginary line VL1 connecting the end face position PR1 and the center of rotation C1.

For example, if the parting line PL is located at the third position P3, the mold MD1 can be released along the direction F1*u*, and the mold MD2 along the direction F2*u*.

On the other hand, if the parting line PL is located at the fourth position P4, the mold MD1 can be released along the direction F1*d*, and the mold MD2 along the direction F2*d*.

Like the layout illustrated in FIG. 28, if the parting line PL is located to overlap the second imaginary line VL2 as illustrated in FIG. 29, the portions of the marking MK that can be undercuts are minimized. If the parting line PL (PLu or PLd) is located at the third position P3 or the fourth position P4, the marking MK has undercuts with no significant effect on the visibility of the marking MK. Suppose, for example, that the parting line PLd is located at the fourth position P4 as illustrated in FIG. 29. This produces undercuts UC but provides sufficient visibility since the outline (edges) of the marking MK are less chamfered.

According to the second embodiment, the releasing directions (F1*u*, F2*u*, F1*d*, and F2*d*) can thus be more freely set by locating the parting line PL and the marking MK at difference positions.

As described above, like the first embodiment, the second embodiment also facilitates the formation of the marking MK having the arrowhead part M1 with simple molds by locating the marking MK in the possible layout area FS1 and locating the parting line PL in the possible layout area FS2. The marking MK formed on the outer peripheral surface 120*f* of the cap 120 is likely to come into the user's field of view, which improves the operability in detaching the cap 120. In other words, the user's operability in detaching the cap 120 from the toner pack 100 can be improved, and the complication of the molds used to manufacture the cap 120 can be reduced.

More specifically, when detaching the cap 120 from the pouch 101 by manual operation (rotation), the user can easily grip the pouch 101 with fingers from both sides in the thickness (Z) direction in which the pouch 101 is smallest and easiest to grip among the height (X), thickness (Z), and width (Y), three directions.

When the user views the outer peripheral surface 120*f* of the cap 120 in the thickness (Z) direction with the pouch 101 in hand, the direction (orientation) of the arrow (marking MK) formed on the outer peripheral surface 120*f* of the cap 120 can naturally come into the user's field of view (i.e., the possible layout area FS1 comes to the front).

If the parting line PL is located in the possible layout area FS2, the parting line PL and the marking MK overlap less and the shape of the marking MK is less affected by the releasing directions of the molds. In other words, the releasing directions can be defined to reduce the degree of chamfering on the outline (edges) of the marking MK, and the sharper shape of the marking MK can be maintained. This can improve the ability to recognize the marking MK.

The second embodiment thus also significantly improves the operability in detaching the cap 120 from the pouch 101 and enables the manufacturing of the cap 120 by injection molding using simple molds.

In particular, as illustrated in FIG. 27, according to the second embodiment, the position PR1 of the rear end face M11*s* of the arrowhead part M1 of the marking MK and the reference position Y0*c* can be located at the same position. The parting line PL can be located at the position on the outer peripheral surface 120*f* of the cap 120 where the second imaginary line VL2 orthogonal to the first imaginary line VL1 passes.

In such a case, the mold MD1 can be released along the direction F1, and the mold MD2 along the direction F2. As can be seen from FIG. 27, if the protruding direction (thickness direction) of the marking MK from the outer peripheral surface 120*f* of the cap 120 and the releasing directions of the molds MD1 and MD2 (directions F1 and F2) are substantially the same, the chamfering (undercuts) of the outline (edges) of the marking MK by the molds decreases. This can maintain the sharper shape of the marking MK and consequently improves the ability to recognize.

As described above, even in the second embodiment, the marking MK is likely to come near the center position of the cap 120 in front of the user when the user grips the pouch 101. Moreover, the molds MD1 and MD2 can be released along the directions F1 and F2. In other words, caps having higher operability (marking recognizability) can be manufactured using simple molds.

Other Exemplary Embodiments

In the foregoing embodiments, the cap 120 is attached to the pack-side shutter 103. However, this is not restrictive. For example, the cap 120 may be attached to the nozzle 102. The attachment of the cap 120 is not limited to the nozzle 102 or the pack-side shutter 103 and may be attached to any member of the toner pack 100 as long as the unit to be mounted 700 of the toner pack 100 can be protected.

In the foregoing embodiments, the fixing tab 120U2 and the cap fixing portion 103*n* are bonded using a primer and an instant glue. However, this is not restrictive. For example, the fixing tab 120U2 and the cap fixing portion 103*n* may be fixed by thermal welding or with a double-sided adhesive tape. The materials of the cap 120 and the unit to be mounted 700 and the shape of the connecting portions 120U3 may be freely modified.

In the foregoing embodiments, the pouch 101 of the toner pack 100 accommodates toner. However, this is not restrictive. For example, the contents accommodated in the pouch 101 may be ink other than toner. Powder or liquid contents can be accommodated. Powder that the pouch 101 can accommodate is not limited to toner, either. If the pouch 101 accommodates ink, the toner pack 100 may be mounted on an inkjet image forming apparatus.

In the foregoing embodiments, the pack-side shutter 103 and the apparatus-side shutter 109 are configured to be rotatable between their shut position and open position about the rotation axes A and B. However, this is not restrictive. For example, the pack-side shutter 103 and the apparatus-side shutter 109 may be configured to be movable between their shut position and open position by translation in parallel with the mounting direction M.

In the foregoing embodiments, the pack-side shutter 103 is configured to open the discharge port 102*a* of the nozzle 102 only at the open position. However, this is not restrictive. For example, the pack-side shutter 103 may be a rotating body that opens the discharge port 102*a* of the nozzle 102 regardless of the rotational position. In such a case, the discharge port 102*a* of the nozzle 102 may be configured to be closed by a seal when the toner pack 100 is not yet to be mounted on the mounting unit 106, and the seal may be removed by the mounting operation on the mounting unit 106 or after the toner pack 100 is mounted. Alternatively, the pack-side shutter 103 of the toner pack 100 may be omitted.

In the foregoing embodiments, the pack-side shutter 103 includes the screw recesses 103*g* that are female threads, and the cap 120 includes the screw protrusions 120*e* that are male threads. However, this is not restrictive. For example, the pack-side shutter 103 may include male threads, and the cap 120 female threads.

In the foregoing embodiments, the cap main body portion 120U1 and the fixing tab 120U2 are connected by the connecting portions 120U3. However, this is not restrictive. For example, the fixing tab 120U2 may be directly fixed to the cap main body 120U1 by adhesion, by snap-fit, or using a magnet. In such a case, the fixing strength between the cap main body portion 120U1 and the fixing tab 120U2 is suitably set to be lower than the adhesive strength between the fixing tab 120U2 and the cap fixing portion 103*n*.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2021-209054, filed Dec. 23, 2021, which is hereby incorporated by reference herein in its entirety.

What is claimed is:

1. A developer container configured to accommodate a developer, comprising:

a pouch including a bottom portion and a side portion extending from the bottom portion to form an opening;

a communication member configured to make inside of the pouch communicate with outside, the communication member being fixed to the opening of the pouch; and a cap formed by injection molding and configured to be detached from the communication member by rotation with respect to the communication member, a marking indicating a direction of rotation to detach the cap from the communication member and a parting line extending in a direction along a rotation axis of the cap being disposed on an outer peripheral surface of the cap which is configured in a cylindrical shape, the marking including an arrowhead part formed to protrude from the outer peripheral surface, the arrowhead part including a rear end located upstream and a front end located downstream in the direction of rotation, wherein a direction connecting the opening and the bottom portion of the pouch is a first direction, a longitudinal direction of a cross-sectional shape of the pouch is a second direction, the second direction being orthogonal to the first direction, and a direction orthogonal to the first direction and the second direction is a third direction, wherein in a state of the cap attached to the communication member, the cap has a reference position on the outer peripheral surface, the reference position being a position in the second direction corresponding to where a thickness of the pouch in the third direction is maximized in a case where the pouch is viewed along the first direction, and wherein the rear end is positioned between a first position and a second position in the direction of rotation of the cap on the outer peripheral surface of the cap when installed on the communication member, the rear end being located to overlap the parting line, the first position end being a position 45° upstream from the reference position in the direction of rotation with the rotation axis as a center of rotation, the second position being a position 45° downstream from the reference position in the direction of rotation with the rotation axis as the center of rotation.

2. The developer container according to claim 1, wherein the arrowhead part protruding from the outer peripheral surface has a height of 1.0 mm or less from the outer peripheral surface.

3. The developer container according to claim 1, wherein the parting line and the rear end overlap the reference position.

4. The developer container according to claim 1, wherein the marking includes a shaft part protruding from the outer peripheral surface, the shaft part being coupled to the rear end of the arrowhead part and extending in the direction of rotation.

5. The developer container according to claim 1, wherein the cap includes a cap main body and a coupling unit disposed on an edge of the cap main body to couple the cap main body to the communication member, the coupling unit being configured to be sheared by a relative movement of the cap main body and the communication member in the direction of rotation.

6. The developer container according to claim 5, wherein the coupling unit is integrally formed with the cap main body and located on the outer peripheral surface at a position 90° upstream or a position 90° downstream from the parting line in the direction of rotation with the rotation axis as the center of rotation.

7. The developer container according to claim 6, wherein the coupling unit includes a coupling portion and a plurality of connecting portions, the coupling portion being coupled and fixed to the communication member, the plurality of connecting portions each being coupled to the cap main body at one end and to the coupling portion at the other end, and wherein two adjoining connecting portions are located at a predetermined distance or more from each other in the direction of rotation.

8. The developer container according to claim 1, wherein the cap is substantially cylindrical in shape.

9. An image forming system comprising: the developer container according to claim 1, and an image forming apparatus including a mounting unit for the developer container to be mounted on, wherein an image forming operation is performed using the developer replenished from the developer container.

10. The image forming system according to claim 9, wherein in a use orientation, the mounting unit is located at an upper part of the image forming apparatus, and wherein the developer container is mounted on the mounting unit in an orientation where the bottom portion is located above the opening in a direction of gravity, the developer container being configured to replenish the image forming apparatus with the developer in a state of being mounted on the mounting unit.

11. The image forming system according to claim 9, wherein the developer container is mounted and unmounted on/from the mounting unit along a direction of gravity.

12. The image forming system according to claim 9, wherein the developer container is configured to replenish the image forming apparatus with the developer by being mounted on the mounting unit during a non-image forming period when the image forming operation is not performed, and wherein the developer container is unmounted from the mounting unit before the image forming operation is started.

13. The image forming system according to claim 9, wherein the developer accommodated in the developer container is a nonmagnetic one-component developer.

14. A developer container configured to accommodate a developer, comprising:

a pouch including a bottom portion and a side portion extending from the bottom portion to form an opening;

a communication member configured to make inside of the pouch communicate with outside, the communication member being fixed to the opening of the pouch; and a cap formed by injection molding and configured to be detached from the communication member by rotation with respect to the communication member, a marking indicating a direction of rotation to detach the cap from the communication member and a parting line extending in a direction along a rotation axis of the cap being disposed on an outer peripheral surface of the cap which is configured in a cylindrical shape, the marking including an arrowhead part formed to protrude from the outer peripheral surface, the arrowhead part including a rear end located upstream and a front end located downstream in the direction of rotation, wherein a direction connecting the opening and the bottom portion of the pouch is a first direction, a longitudinal direction of a cross-sectional shape of the pouch is a second direction, the second direction being orthogonal to the first direction, and a direction orthogonal to the first direction and the second direction is a third direction, wherein in a state of the cap attached to the communication member, the cap has a reference position on the outer peripheral surface, the reference position being a position in the second direction corresponding to where a thickness of the pouch in the third direction is maximized in a case where the pouch is viewed along the first direction, wherein at least a part of the arrowhead part is disposed along the outer peripheral surface between a first position and a second position in the direction of rotation, the first position being a position 45° upstream from the reference position in the direction of rotation with the rotation axis as a center of rotation, the second position being a position 45° downstream from the reference position in the direction of rotation with the rotation axis as the center of rotation, and wherein in a case where seen along the first direction, the parting line is positioned between a third position and a fourth position in the direction of rotation of the cap on the outer peripheral surface of the cap when installed on the communication member, the third position being located 45° upstream of a position where a second imaginary line intersects the outer peripheral surface of the cap, the second imaginary line being orthogonal to a first imaginary line connecting a position where the rear end intersects the outer peripheral surface and the center of rotation of the cap and passing through the center of the rotation of the cap, the fourth position being located 45° downstream of a position where the second imaginary line intersects the outer peripheral surface of the cap.

15. A developer container configured to accommodate a developer, comprising:

a pouch including a bottom portion and a side portion extending from the bottom portion to form an opening;

a communication member configured to make inside of the pouch communicate with outside, the communication member being fixed to the opening of the pouch; and a cap formed by injection molding and configured to be detached from the communication member by rotation with respect to the communication member, a marking indicating a direction of rotation to detach the cap from the communication member and a parting line extending in a direction along a rotation axis of the cap being disposed on an outer peripheral surface of the cap which is configured in a cylindrical shape extending in the same direction as the rotation axis of the cap, the marking including an arrowhead part including a rear end located upstream and a front end located downstream in the direction of rotation, wherein the rear end is located to overlap the parting line on the outer peripheral surface of the cap.

* * * * *